(12) United States Patent
Inoue et al.

(10) Patent No.: US 8,725,718 B2
(45) Date of Patent: May 13, 2014

(54) CONTENT MANAGEMENT APPARATUS, CONTENT MANAGEMENT METHOD, CONTENT MANAGEMENT PROGRAM, AND INTEGRATED CIRCUIT

(75) Inventors: Ryuji Inoue, Osaka (JP); Ryota Tsukidate, Osaka (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 13/391,473

(22) PCT Filed: Mar. 14, 2011

(86) PCT No.: PCT/JP2011/001458
§ 371 (c)(1),
(2), (4) Date: Feb. 21, 2012

(87) PCT Pub. No.: WO2011/161851
PCT Pub. Date: Dec. 29, 2011

(65) Prior Publication Data
US 2012/0150893 A1 Jun. 14, 2012

(30) Foreign Application Priority Data

Jun. 22, 2010 (JP) ................................. 2010-142106

(51) Int. Cl.
*G06F 17/30* (2006.01)
(52) U.S. Cl.
USPC ....................... 707/708; 707/725; 707/E17.02
(58) Field of Classification Search
None
See application file for complete search history.

(56) References Cited

U.S. PATENT DOCUMENTS

| | | | |
|---|---|---|---|
| 2004/0128301 A1* | 7/2004 | Thint et al. | 707/101 |
| 2008/0235275 A1 | 9/2008 | Tanaka et al. | |
| 2011/0047229 A1* | 2/2011 | Sinha et al. | 709/206 |
| 2011/0138478 A1* | 6/2011 | Kaarela et al. | 726/27 |

FOREIGN PATENT DOCUMENTS

| | | |
|---|---|---|
| JP | 4-130871 | 5/1992 |
| JP | 2001-357045 | 12/2001 |
| JP | 2005-107831 | 4/2005 |
| JP | 2005-196598 | 7/2005 |
| JP | 2005-354134 | 12/2005 |
| JP | 2009-64148 | 3/2009 |

OTHER PUBLICATIONS

International Search Report issued Jun. 21, 2011 in International (PCT) Application No. PCT/JP2011/001458.

* cited by examiner

*Primary Examiner* — Anteneh Girma
(74) *Attorney, Agent, or Firm* — Wenderoth, Lind & Ponack, L.L.P.

(57) ABSTRACT

When registering content in a data storage unit (101), a data registration unit (102) transmits, to another content management apparatus, metadata that is assigned to the content. The content management apparatus which has received the metadata returns related metadata that is related to the received metadata. An import determination unit (105) determines whether or not each of the metadata elements included in the returned related metadata is importable. The metadata elements which have been determined to be importable, within the related metadata, are added by a metadata editing unit 106 as a part of the metadata of the content that is to be registered.

15 Claims, 33 Drawing Sheets

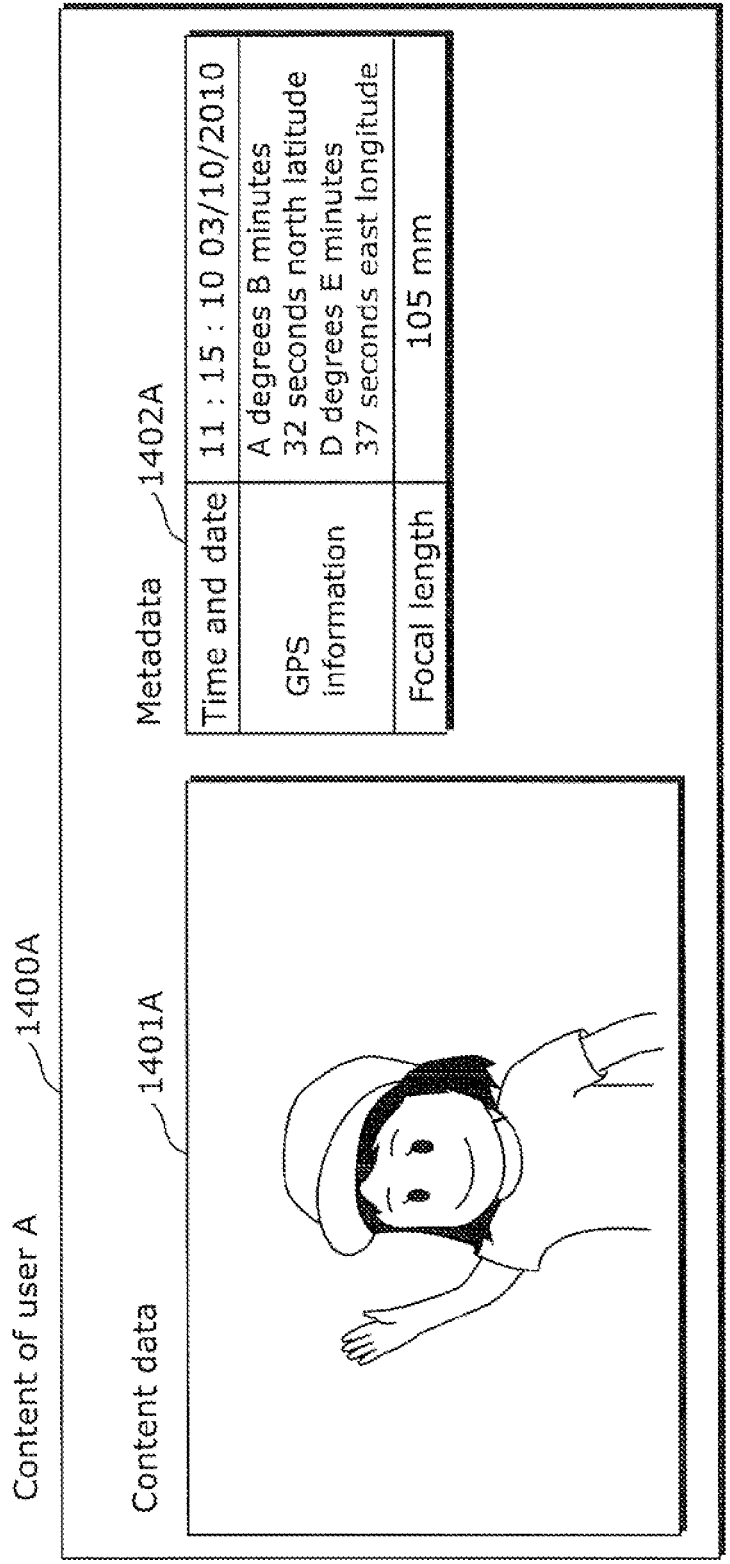

FIG. 23B

Content of user B — 2000B

Content data — 2001B

Metadata — 2002B

| Time and date | 11 : 15 : 09 03/10/2010 |
| --- | --- |
| GPS information | A degrees B minutes 32 seconds north latitude D degrees E minutes 37 seconds east longitude |
| Focal length | 105 mm |
| Facial feature value | ... |
| Name of person | Hanako |
| Name of event | Sports day at ABC Primary School |
| Comment | Big smile! |

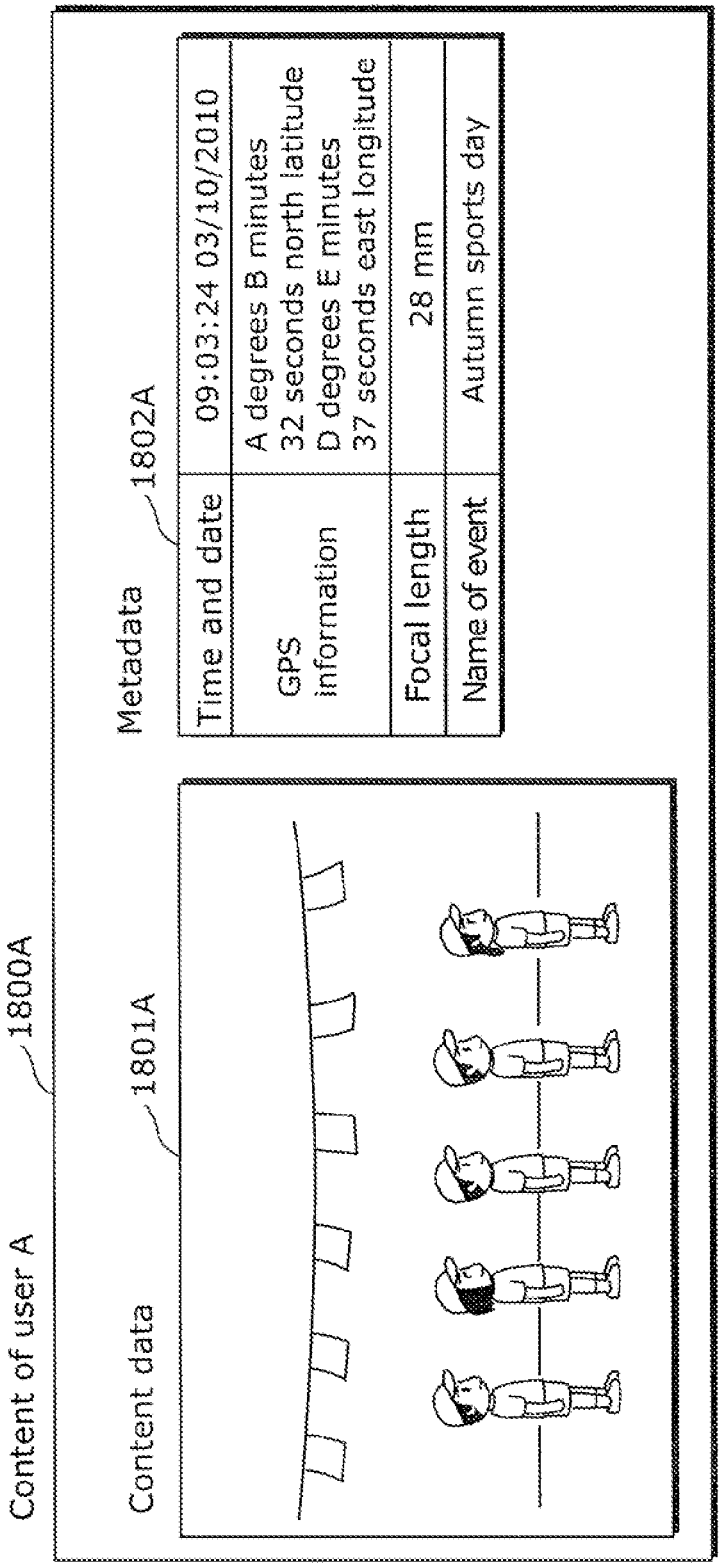

US 8,725,718 B2

CONTENT MANAGEMENT APPARATUS, CONTENT MANAGEMENT METHOD, CONTENT MANAGEMENT PROGRAM, AND INTEGRATED CIRCUIT

TECHNICAL FIELD

The present invention relates to a content management apparatus, a content management method, a content management program, and an integrated circuit for managing contents such as images, audio, moving images and text. The invention relates particularly to assignment of metadata necessary for a content search or application use.

BACKGROUND ART

In recent years, with the broad use of digital still cameras, digital camcorders and camera phones, the user shoots and stores vast amounts of contents, and thus it has become difficult for the user to manage the contents.

A content management method, in general, is a method used for giving, to a folder for storing content, a title which includes time and date, a name of person, and a name of event, and used also for assigning metadata to content in a content management application program, when content is saved in a personal computer or in a content management apparatus. However, it is extremely difficult to handle such content management operations for the users who are not skillful at operating a device. Moreover, the content management operations may cause some psychological burden on the users who are not so bad at operating a device but have failed to manage contents for a long period of time while the contents have been stored. Sharing of the metadata assigned by other users is conceivable as a way to provide such users with a clue for searching out what they desire to view from the contents that have been stored in large amounts.

Among the conventional content management apparatuses, some compare metadata respectively assigned to plural contents, create a union of sets for the elements of each metadata in the case where the metadata elements are same or associated with each other in a predefined way, and increase/update the existing metadata by assigning the union to the existing metadata as a metadata element of the plural contents (see reference to Patent Literature 1).

In addition, among the conventional apparatuses are those which prestore unshared words indicating the words the user does not want the others to know, such as personal information, create metadata from which such unshared words are excluded, and allow an unauthorized user to share the metadata from which the unshared words have previously been excluded so that the metadata is shared while the personal information is protected (see reference to Patent Literature 2).

Moreover, it is a well-known technology to identify an object of photographing which a photographer intends to photograph, using photographic information (e.g., magnification, a camera-subject distance, etc.) of a photographing device so as to control the camera parameters of the device (see reference to Patent Literature 3).

CITATION LIST

Patent Literature

[PTL 1] Japanese Unexamined Patent Application Publication No. 2005-196598
[PTL 2] Japanese Unexamined Patent Application Publication No. 2009-064148
[PTL 3] Japanese Unexamined Patent Application Publication No. H4-130871

SUMMARY OF INVENTION

Technical Problem

However, with the technology of simply generating a union of sets for metadata elements, as disclosed in Patent Literature 1, there is a risk that the elements which are unnecessary for the user on one side may be included in the generated union. For instance, in the case where a name of a person who does not appear in content of one user is included in the metadata of content of the other user, the metadata that includes the name of the person who does not appear in the content may be assigned to that content when a union of sets is generated for the metadata elements of the both contents.

According to the technology disclosed in Patent Literature 2, the information a user does not want to share, such as personal information, is excluded from metadata so that the metadata is shared with an unauthorized user. It is conceivable, however, that the users are both authorized in the case where the users are parent and child living in different places or mothers having small children. Therefore, for the sharing of metadata in such case, the problem as described above still remains to be solved. In other words, there is a risk that the elements unnecessary for one user but not for the other may be included. Another problem is that when the words indicating information other than personal information are determined to be unshared words, useful metadata may also be excluded and thus cannot be assigned to content. For example, when content is an image of a flower and the unshared words include names of flower, it is impossible to assign to the image content a name of the flower, which is information useful for the user.

The technology disclosed in Patent Literature 3 aims to make a good use of photographic information for the camera parameter (exposure in many cases) control of a photographing device. Therefore, sharing, between the devices, of the photographic information and the metadata regarding a subject identified based on the photographic information is not considered therein.

The present invention has been conceived to solve the conventional problems as stated above and aims to provide a content management apparatus which can import useful metadata without importing unnecessary metadata when metadata is assigned to content through the sharing of the metadata held by another content management apparatus.

Solution to Problem

In order to solve the conventional problems, the content management apparatus according to an aspect of the present invention is a content management apparatus which includes: a metadata transmitting and receiving unit configured to transmit, to an other content management apparatus, first metadata which is a type of metadata assigned to content data, and to receive first related metadata which is metadata related to the transmitted first metadata; an import determination unit configured to determine whether the first related metadata received by the metadata transmitting and receiving unit is importable or not; and a metadata editing unit configured to update the first metadata by adding, to the first metadata, the first related metadata determined to be importable by the import determination unit.

With this configuration, the content management apparatus can prevent an import of unnecessary metadata and achieve an import of useful metadata by determining whether or not to import metadata when assigning metadata to content through the sharing of the metadata held by another content management apparatus.

Preferably, the above-described content management apparatus further includes an unshared information storage unit configured to store unshared information indicating information that is not to be imported as metadata, wherein the import determination unit is configured to determine that the first related metadata is not importable in the case where information included in the first related metadata includes the unshared information stored in the unshared information storage unit.

With this configuration, the content management apparatus can determine, within the related metadata (first related metadata) received from the other content management apparatus, that the information that is not useful for sharing is not importable.

More preferably, the unshared information includes a word that is at least one of names of persons and sensitivity words.

With this configuration, it is possible to determine that the information that is not useful for sharing in some cases, such as names of persons or sensitivity words, is not importable.

More preferably, the above-described content management apparatus may include a shared information storage unit configured to store shared information indicating information that is to be imported as metadata, wherein the import determination unit is configured to determine that the first related metadata is importable in the case where information included in the first related metadata includes the shared information stored in the shared information storage unit.

With this configuration, the content management apparatus can determine, within the related metadata (first related metadata) received from another content management apparatus, that the information that is useful for sharing is importable.

Furthermore, the shared information includes a word that is at least one of the following: names of persons; addresses; names of to landmarks; and names of events.

With this configuration, it is possible to determine that the information that is useful for sharing in some cases, such as names of persons, addresses, names of landmarks and names of events, is importable.

Furthermore, the content data is image data, and the import determination unit may be configured to determine whether the first related metadata is importable or not based on photographic information included in the first metadata and photographic information included in the first related metadata.

With this configuration, the content management apparatus presumes a user's intention using the photographic information, and based on the presumption, the content management apparatus can determine whether or not the related metadata (first related metadata) received from the other content management apparatus is importable.

Preferably, the photographic information includes at least information regarding focal length.

With this configuration, it is possible to presume a user's intention of photographing based on the focal length information.

More preferably, the import determination unit is further configured to determine that the first related metadata is importable in the case where a distance between an image feature included in the first metadata and an image feature included in the first related metadata is equal to or smaller than a predetermined value.

With this configuration, the content management apparatus presumes a user's intention using the photographic information, and based on the presumption and also by comparing the facial feature values, the content management apparatus can determine whether or not the related metadata (first related metadata) received from other content management apparatus is importable.

Furthermore, the above-described content management apparatus may further include a data storage unit configured to store content data and metadata that is assigned to the content data; and a data registration unit configured to register the content data and the metadata into the data storage unit, and to transmit the metadata as the first metadata to the other content management apparatus via the metadata transmitting and receiving unit, the metadata being registered together with the content data.

With this configuration, the content management apparatus can add metadata when registering content data and metadata into the data storage unit.

Furthermore, the above-described content management apparatus may include a data reading unit configured to read the content data and the metadata from the data storage unit, and to transmit the metadata as the first metadata to the other content management apparatus via the metadata transmitting and receiving unit, the metadata being read together with the content data.

With this configuration, the content management apparatus can add metadata also at the time of reading content data.

Furthermore, the above-described content management apparatus may further include a metadata search unit configured: to receive second metadata from an other content management apparatus via the metadata transmitting and receiving unit; to search the data storage unit for second related metadata which is metadata related to the received second metadata; and to transmit the searched-out second related metadata to the other content management apparatus via the metadata transmitting and receiving unit.

Furthermore, the metadata search unit is configured: to receive the second metadata from the other content management apparatus via the metadata transmitting and receiving unit; to search the data storage unit for second related metadata which is metadata including at least one of time and date information and location information, which respectively have a value that is within a predetermined range from a reference point that is at least one of values indicated in time and date information and location information which are included in the received second metadata; and to transmit the searched-out second related metadata to the other content management apparatus via the metadata transmitting and receiving unit.

With this configuration, for content like image content to which information such as photographing time and date or a photographing location is assigned as metadata, it is possible to target for import determination metadata (second related metadata) assigned to the content of which the photographing time and date or the photographing location is close to the photographing time and date or the photographing location of the image content.

It should be noted that the present invention can be implemented, not only as the content management apparatus which includes such characteristic processing units, but also as a content management method having, as steps, the characteristic processing units included in the content management apparatus. It is also possible to implement the present invention as a content management program which causes a computer to execute the characteristic steps included in the content management method. Needless to say, such a program can be distributed via a computer-readable nonvolatile recording medium such as a CD-ROM (Compact-Disc-Read Only Memory) and via a communication network such as the Internet. Moreover, the present invention can be implemented as an integrated circuit incorporating the same processing units as those included in the content management apparatus.

Advantageous Effects of Invention

According to the present invention, it is possible to import useful metadata without importing unnecessary metadata when metadata is assigned to content through the sharing of the metadata held by another content management apparatus.

BRIEF DESCRIPTION OF DRAWINGS

FIG. 16A is a diagram showing a specific example of content.

FIG. 23B is a diagram showing another specific example of content.

FIG. 25A is a diagram showing a specific example of content.

DESCRIPTION OF EMBODIMENTS

Embodiments of the present invention will be described in detail below with reference to the drawings. It should be noted that image data is taken as an example of content data in the description; nevertheless, the content data intended for the present invention is not restricted to image data.

[Embodiment 1]

Figure 1:
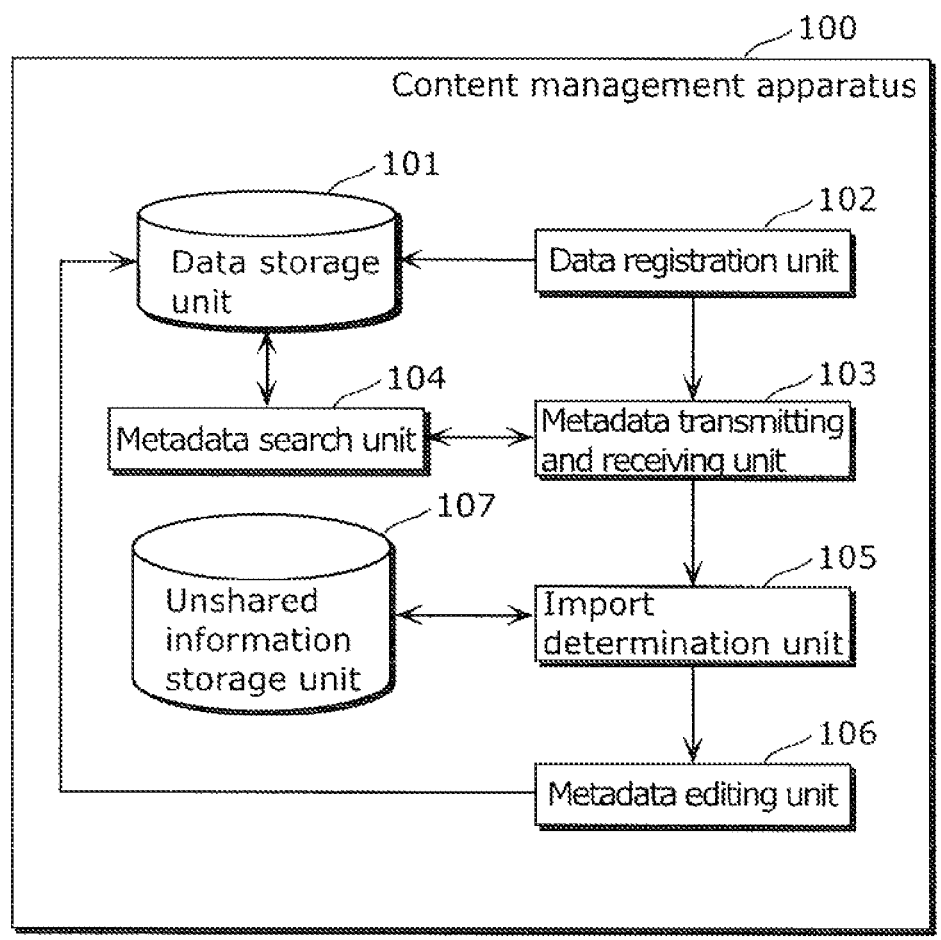
FIG. 1 is a block diagram showing a functional structure of a content management apparatus according to Embodiment 1.

FIG. 1 is a diagram showing a functional structure of a content management apparatus 100 according to Embodiment 1 of the present invention. Within the metadata stored in another content management apparatus connected via a communication network, the content management apparatus 100 of the present embodiment does not import metadata which is not always useful for sharing, but imports metadata other than that. It should be noted that the Internet and a LAN (Local Area Network) are assumed to be the representative examples of a communication network, however, the content management apparatus 100 and another content management apparatus may be connected via a short-range wireless communication such as a Bluetooth (registered trademark), a ZigBee (registered trademark) or the like, or they may be directly connected via a cable.

The content management apparatus 100 includes a data storage unit 101, a data registration unit 102, a metadata transmitting and receiving unit 103, a metadata search unit 104, an import determination unit 105, a metadata editing unit 106 and an unshared information storage unit 107.

The data storage unit 101 is a storage device which stores content data and metadata related to the content data (assigned to the content data). The data registration unit 102 registers content and metadata into the data storage unit 101. The metadata transmitting and receiving unit 103 sends and receives metadata to and from another content management apparatus 100 via a communication network. The metadata search unit 104 searches the data storage unit 101 for related metadata that is metadata related to metadata received from another content management apparatus 100, and outputs searched-out related metadata to the metadata transmitting and receiving unit 103. The import determination unit 105 receives the related metadata from the metadata transmitting and receiving unit 103, and determines whether or not the related metadata searched out by another content management apparatus 100 is importable. The metadata editing unit 106 updates the existing metadata stored in the data storage unit 101 by adding, as metadata of the content data stored in the data storage unit 101, the related metadata which the import determination unit 105 has determined to be importable.

Note here that the metadata transmitting and receiving unit 103 waits for metadata to be transmitted from the data registration unit 102, and also waits for metadata to be transmitted from another content management apparatus 100 that is connected via a communication network. The former operation will be explained with reference to FIG. 7 and the latter operation will be described with reference to FIG. 8.

Figure 2:
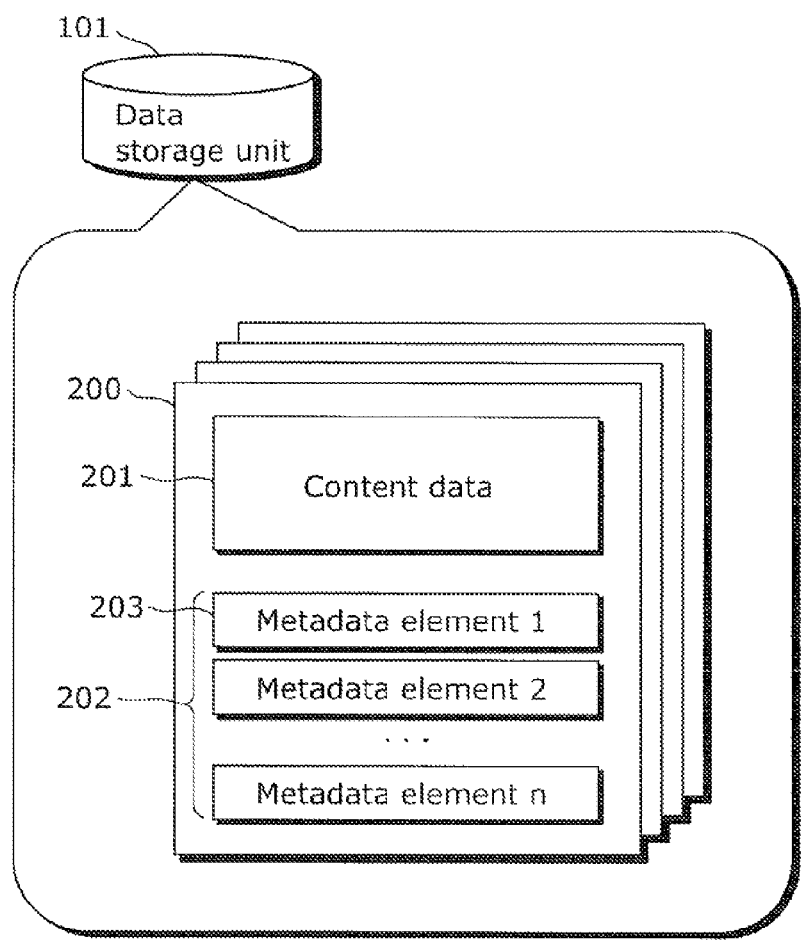
FIG. 2 is a diagram showing a structure of content.

FIG. 2 is a diagram showing content 200 stored in the data storage unit 101. The content 200 includes content data 201 and metadata 202. The metadata 202 includes one or more metadata elements 203.

Figure 3:
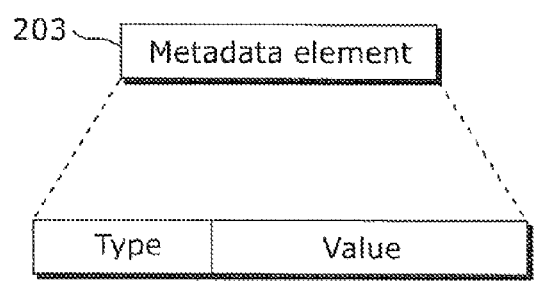
FIG. 3 is a diagram showing a structure of a metadata element.

FIG. 3 is a diagram showing a structure of the metadata element 203. The metadata element 203 is made up of a pair of a type and a value. Types can be grossly divided into two groups: those (e.g., time and date, GPS information, photographic information, etc.) which are automatically assigned by a photographing device; and those (e.g., names of persons, names of events, comments, etc.) which are assigned by the user himself/herself. A photographing device or a content management apparatus of recent date is equipped with a function to automatically recognize in content a face of a person that is registered in advance. According to such photographing device or content management apparatus, it is conceivable that names of persons are automatically assigned as metadata.

Figure 4:
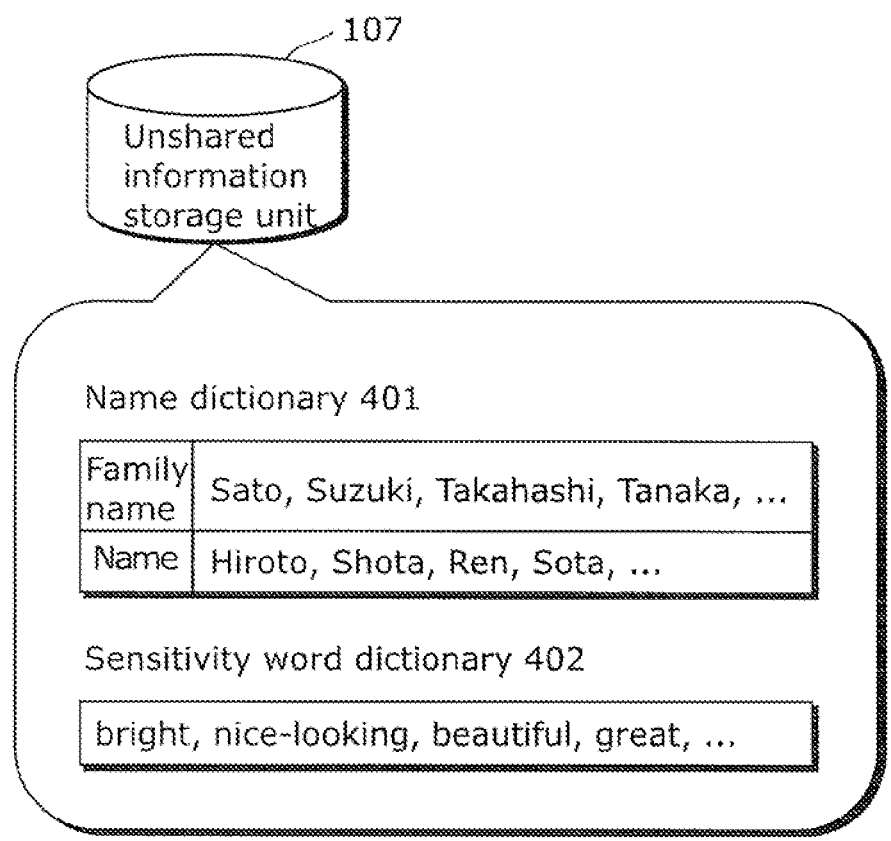
FIG. 4 is a diagram showing examples of dictionaries stored in an unshared information storage unit.

FIG. 4 is a diagram showing examples of the dictionaries stored in the unshared information storage unit 107. In the example, a name dictionary 401 and a sensitivity word dictionary 402 are stored in the unshared information storage unit 107. The dictionaries are stored in such manner to avoid sharing of the metadata that includes a name of a person and a sensitivity word for the following reasons: even though the contents that are separately photographed are photographed at the same time and date and in the same location, this does not always mean that the same person is photographed as a subject in the respective contents; and a sensitivity word representing how a user feels does not always presents the same feeling for other users. In FIG. 4, it is assumed that names and family names are separately registered in the name dictionary 401; however, a structure of the dictionary is not a focus of the present invention, and thus a detailed description thereof will be omitted. It is also presumed that sensitivity words that the user may input as comments, such as "bright", "nice-looking", "beautiful" and others are registered in the sensitivity word dictionary 402. As is the case of the name dictionary 401, a detailed description on a structure of the sensitivity word dictionary 402 will be omitted here. Note that the unshared information storage unit 107 may not store plural dictionaries. In other words, the unshared information storage unit 107 may simply store groups of words undesirable for sharing instead of a dictionary in which the words are categorized.

The operations of the content management apparatus 100 will be described with reference to FIGS. 5 through 10. For descriptive convenience, it is presumed that plural content management apparatuses 100A and 100B are connected via a communication network, as shown in FIG. 5.

Figure 5:
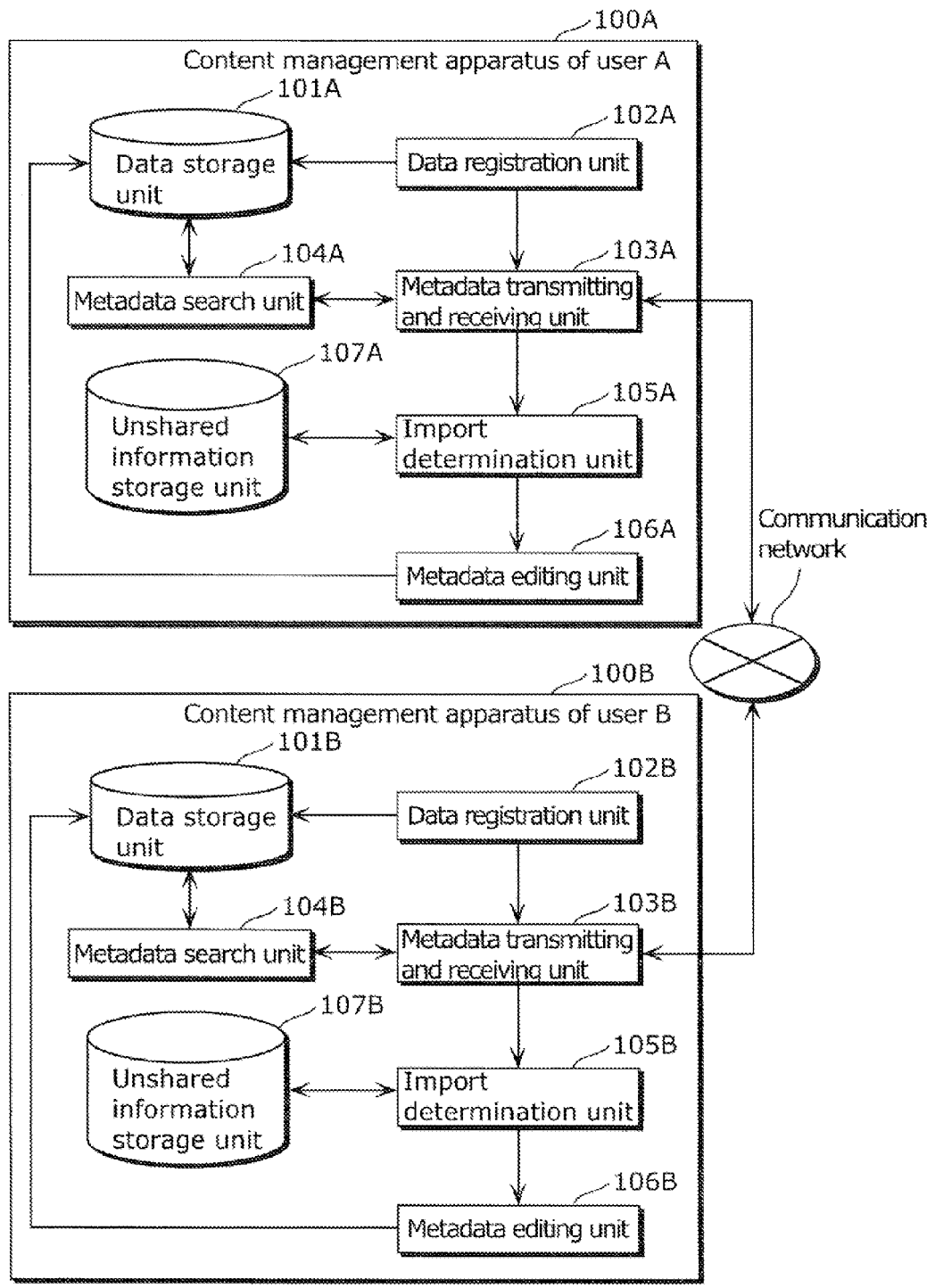
FIG. 5 is a diagram showing a state in which plural content management apparatuses are connected via a network.

FIG. 5 is a diagram showing a system in which a content management apparatus 100A that a user A uses (to be referred to as "the content management apparatus of the user A" hereinafter) and a content management apparatus 100B that a user B uses (to be referred to as "the content management apparatus of the user B" hereinafter) are connected via a communication network. Each of the content management apparatuses 100A and 100B has the same components as the components of the content management apparatus 100 shown in FIG. 1. In order to distinguish between the components of the content management apparatus 100A and the components of the content management apparatus 100B, a sign "A" is added to the components of the content management apparatus 100A and a sign "B" is added to the components of the content management apparatus 100B. For instance, the data storage unit 101 of the content management apparatus 100A is denoted as "data storage unit 101A" and the data storage unit 101 of the content management apparatus 100B is denoted as "data storage unit 101B".

The content management apparatuses 100A and 100B send and receive metadata to and from each other via a metadata transmitting and receiving unit 103A and a metadata transmitting and receiving unit 103B, respectively. As a result, the metadata registered in the content management apparatus 100B is imported into the content management apparatus 100A.

First, a flow of the processing for the metadata import performed between the content management apparatuses 100A and 100B will be described, and then, a detailed description of each operation follow.

Figure 6:
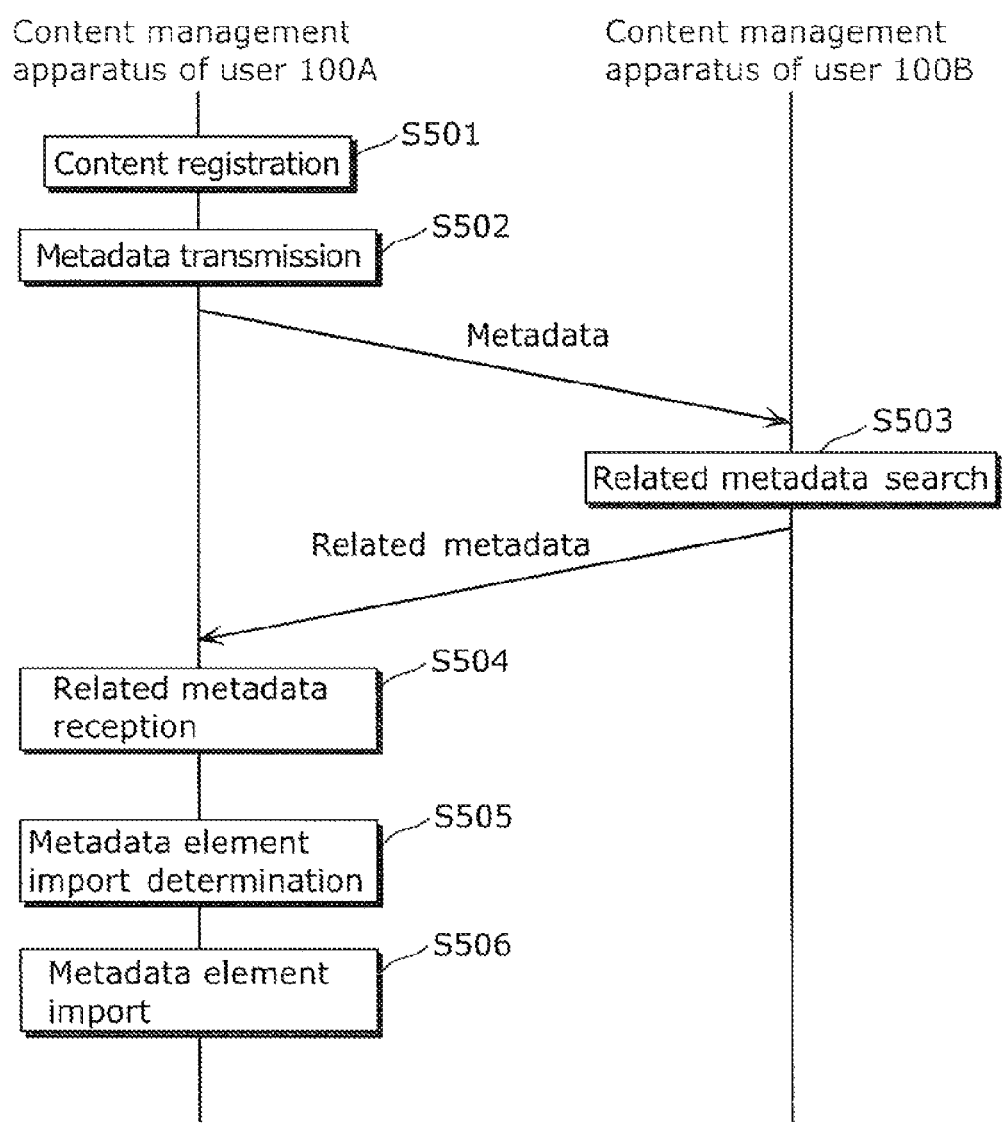
FIG. 6 is a diagram showing a flow of processing for importing metadata performed between plural content management apparatuses.

FIG. 6 is a diagram showing the flow of the processing for importing metadata performed between the content management apparatuses 100A and 100B.

In the content management apparatus 100A of the user A, it is assumed that the user A registers content of a newly-photographed image (S501). That is to say that the user A registers content that is recorded in a photographing device into the content management apparatus 100A, using an interface, e.g., a USB (Universal Serial Bus) or a memory card slot, which is not shown in the diagram. The data registration unit 102A registers, into the data storage unit 101A, the content inputted via the interface, and also outputs, to the metadata transmitting and receiving unit 103A, metadata (e.g., time and date, GPS information, photographic information, etc.) that is automatically recorded as an attachment to the content.

The metadata transmitting and receiving unit 103A transmits, to the content management apparatus 100B, the metadata received from the data registration unit 102A (S502). The content management apparatus 100B searches the metadata stored by the content management apparatus 100B itself for related metadata which is related to the metadata received from the metadata transmitting and receiving unit 103A, and transmits the related to metadata which is a result of the search to the content management apparatus 100A (S503).

The content management apparatus 100A receives the related metadata from the content management apparatus 100B (S504), and determines whether or not the received related metadata is importable (S505). The content management apparatus 100A imports the metadata element which has been determined to be importable (S506).

Figure 7:
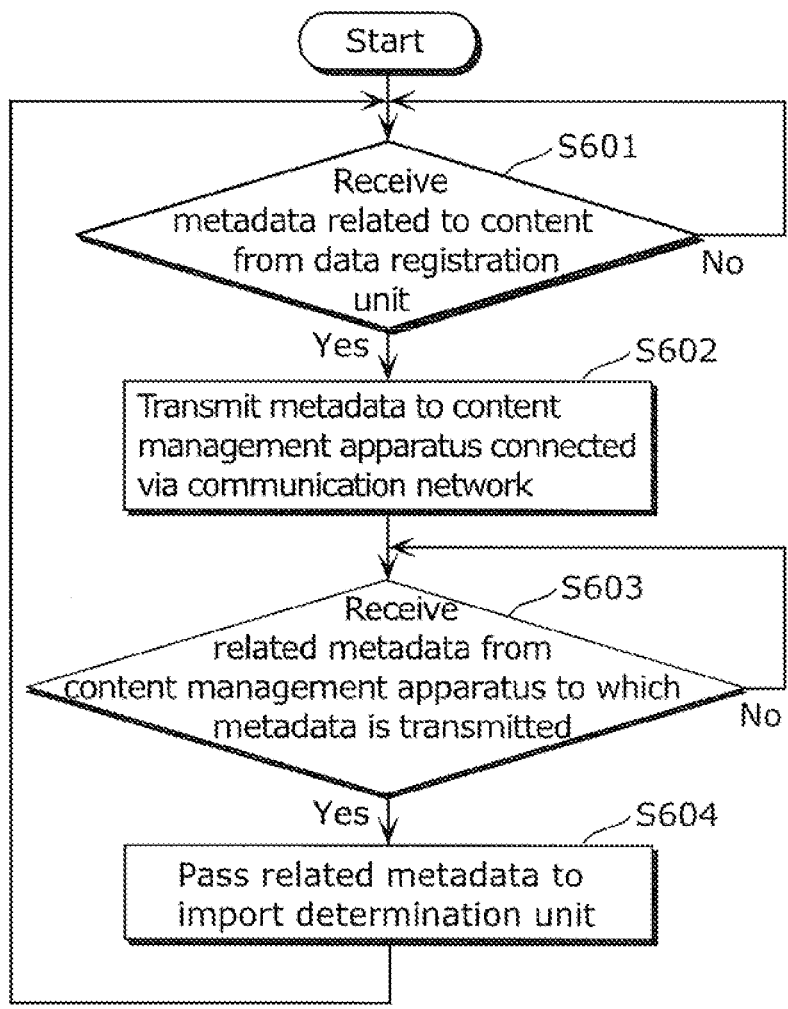
FIG. 7 is a flowchart showing an operation of a metadata transmitting and receiving unit on the metadata sending side.

The following describes in detail the processing in S502 and S504 with reference to FIG. 7. Also, the processing in S503 will be described in detail with reference to FIGS. 8 and 9. Then, the processing in S505 will be explained in detail with reference to FIG. 10.

FIG. 7 is a flowchart showing an operation of the metadata transmitting and receiving unit 103A of the content management apparatus 100A. The processing described in S601 and S602 corresponds to the processing of the metadata transmission (S502 in FIG. 6), and the processing described in S603 and S604 corresponds to the processing of the related metadata reception (S504 in FIG. 6).

The metadata transmitting and receiving unit 103A firstly waits for a reception of the metadata to be transmitted from the data registration unit 102A (S601). When receiving metadata of the content from the data registration unit 102A (Yes in S601), the metadata transmitting and receiving unit 103A transmits the received metadata to the content management apparatus 100B (S602), and waits for related metadata to be transmitted from the content management apparatus 100B (S603). When receiving related metadata from the content management apparatus 100B (Yes in S603), the metadata transmitting and receiving unit 103A outputs the received related metadata to the import determination unit 105A (S604), and returns again to the state of waiting for the reception of metadata (S601).

Figure 8:
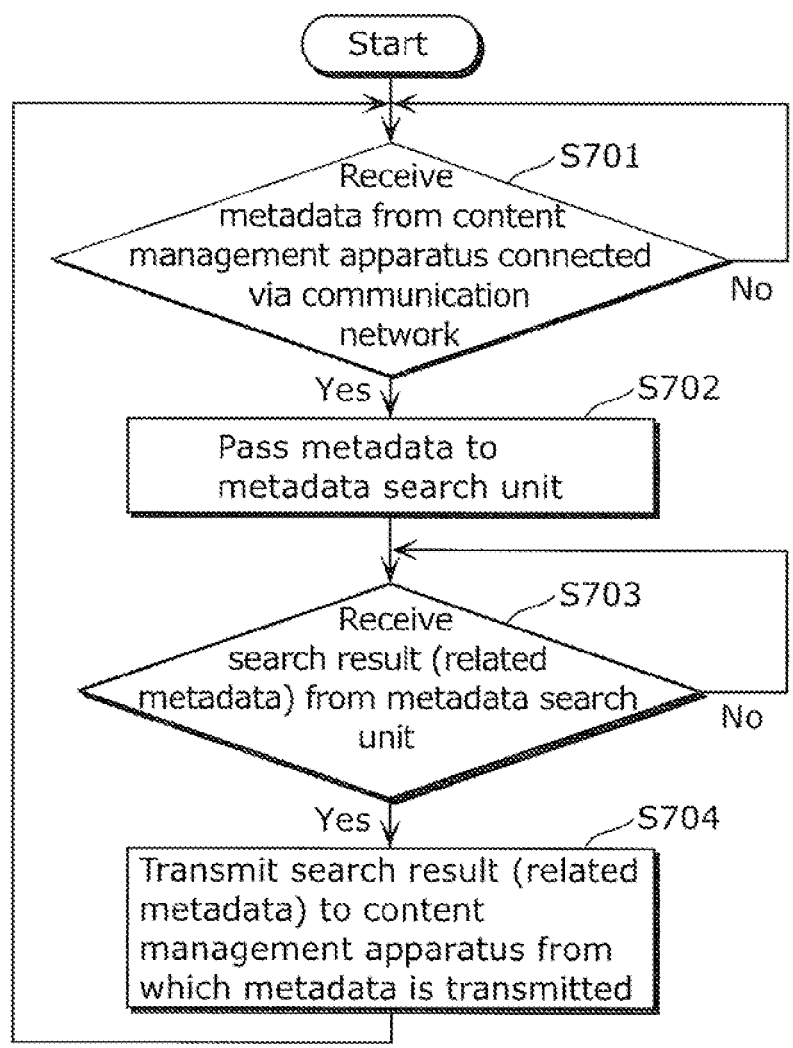
FIG. 8 is a flowchart showing an operation of a metadata transmitting and receiving unit on the metadata receiving side.

FIG. 8 is a flowchart showing an operation of the metadata transmitting and receiving unit 103B of the content management apparatus 100B. The processing shown in FIG. 8 corresponds to the processing of the related metadata search (S503 in FIG. 6).

The metadata transmitting and receiving unit 103B waits for a reception of the metadata to be transmitted from the content management apparatus 100A connected via the communication network (S701). When receiving metadata from the content management apparatus 100A (Yes in S701), the metadata transmitting and receiving unit 103B outputs the received metadata to the metadata search unit 104B (S702), and waits for related metadata which is a search result to be outputted from the metadata search unit 104B (S703). When receiving the related metadata which is the search result from the metadata search unit 104B, the metadata transmitting and receiving unit 103B transmits the received search result (related metadata) to the content management apparatus 100A (S704), and returns again to the state of waiting for the reception of metadata (S701).

Figure 9:
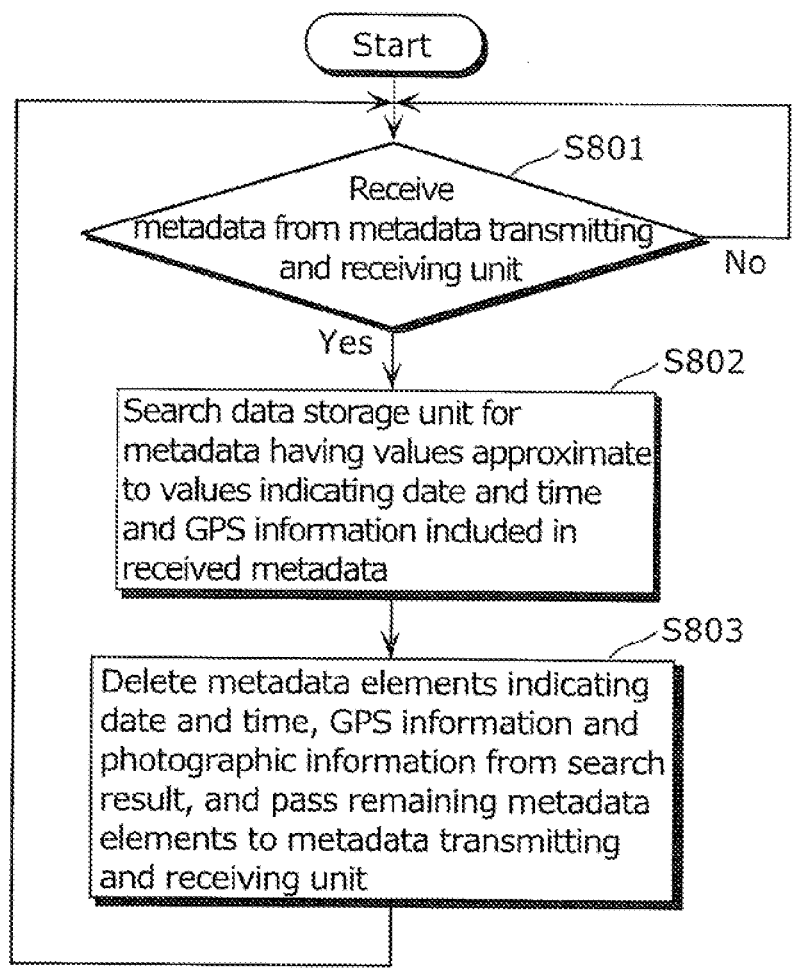
FIG. 9 is a flowchart showing an operation of a metadata search unit.

FIG. 9 is a flowchart showing an operation of the metadata search unit 104B of the content management apparatus 100B. The processing shown in FIG. 9 is a processing executed by the metadata search unit 104B as a response to the processing of passing the metadata (S702 in FIG. 8).

In the search of related metadata, the metadata search unit 104B determines whether or not metadata can be a search result (related metadata) based on the closeness with respect to the time and date and the location of photographing which are included in the received metadata. This is because when the values, which indicate time and date and location and are included in each metadata of plural contents, are close to some extent, it is possible to estimate that these contents are photographed in the same situation.

The metadata search unit 104B waits for a reception of the metadata to be transmitted from the metadata transmitting and receiving unit 103B (S801). When receiving metadata from the metadata transmitting and receiving unit 103B (Yes in S801), the metadata search unit 104B searches the data storage unit 101B for the metadata which includes time and date and GPS information, of which the values are close to the values of the metadata elements indicating time and date and GPS information included in the received metadata (S802). Here, "close" means that a value indicating time and date is within a predetermined range of time (e.g., three minutes) with respect to the value indicating time and date included in the received metadata. As for the GPS information, "close" means that a value indicating GPS information is within a predetermined range of area (e.g., from −3 to +3 seconds for both latitude and longitude, that is, from −93 meters to +93 meters) with respect to the value indicating GPS information included in the received metadata. The metadata search unit 104B deletes the metadata elements of which the types are time and date, GPS information, and photographic information from the metadata that is a result of the search, and outputs the remaining metadata elements as related metadata to the metadata transmitting and receiving unit 103B (S803).

Figure 10:
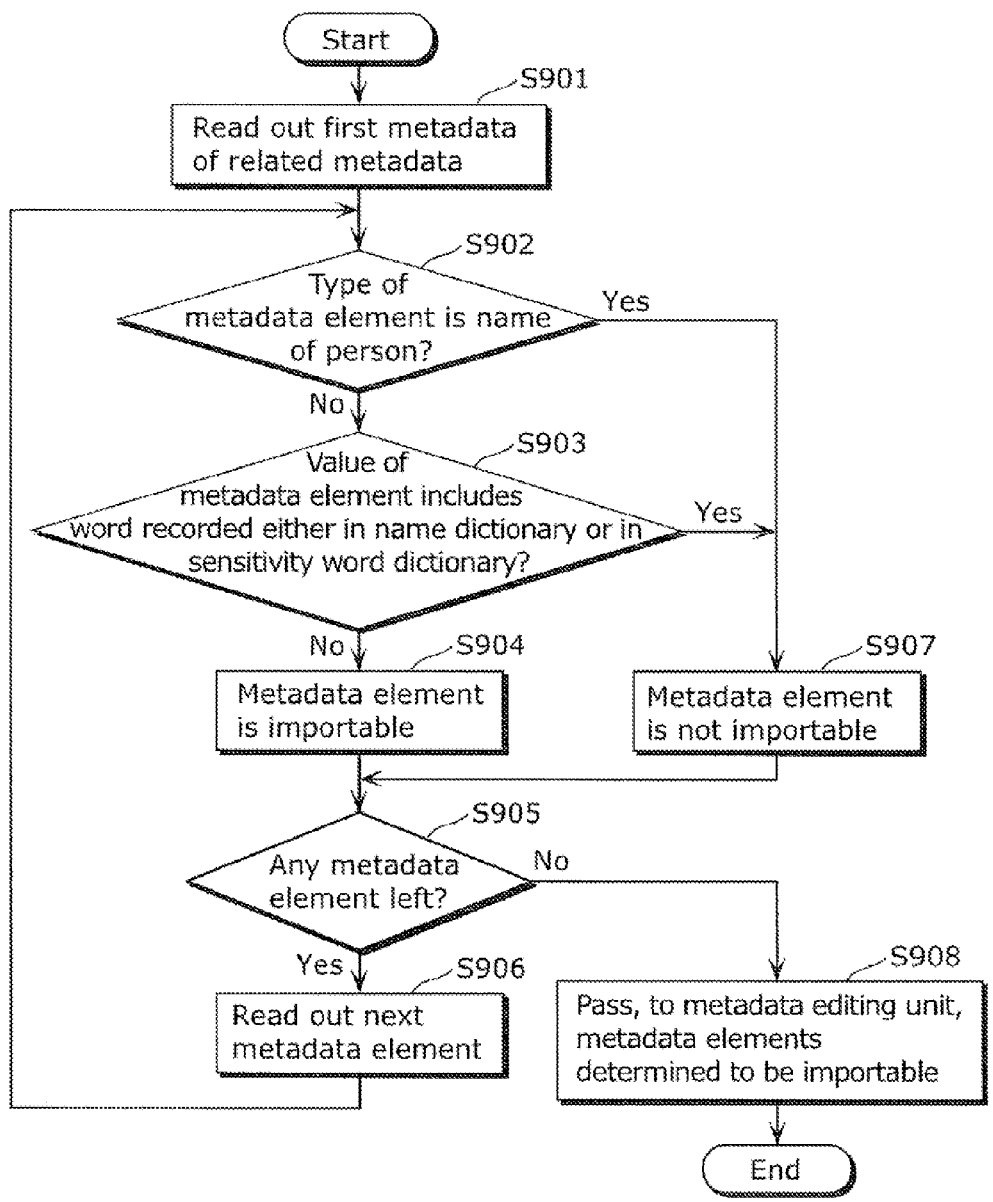
FIG. 10 is a flowchart showing an operation of an import determination unit.

FIG. 10 is a flowchart showing an operation of the import determination unit 105A of the content management apparatus 100A. The processing described in FIG. 10 corresponds to the processing of the metadata element import determination (S505 in FIG. 6).

When receiving related metadata from the metadata transmitting and receiving unit 103A, the import determination unit 105A firstly reads a first metadata element from one or more metadata elements included in the related metadata (S901).

The import determination unit 105A then examines whether or not a type of the read-out metadata element is name of person (S902). When the type is not name of person, the import determination unit 105A proceeds to S903, and when the type is name of person, the import determination unit 105A proceeds to S907.

In S903, the import determination unit 105A examines whether or not a value of the read-out metadata element includes a word that is registered either in the name dictionary 401 or in the sensitivity word dictionary 402. When the value does not include such word, the import determination unit 105A proceeds to S904, and when the value includes such word, the import determination unit 105A proceeds to S907.

In S904, the import determination unit 105A determines that the read-out metadata element is importable and proceeds to S905. In S907, the import determination unit 105A determines that the read-out metadata element is not importable and proceeds to S905.

In S905, the import determination unit 105A examines whether or not there is any remaining metadata element that has not is been read, reads the next metadata element if there is any (S906), and returns to the processing starting from S902. Not finding any such metadata element, the import determination unit 105A outputs, to the metadata editing unit 106A, all the metadata elements that have been determined to be importable (S908) and ends the processing.

The metadata editing unit 106A adds the metadata elements which have been determined to be importable and received from the import determination unit 105A, to the metadata which is related to the content and has been registered since a short while ago by the data registration unit 102A into the data storage unit 101A (S506 in FIG. 6).

By performing the processing as described above for each content that is to be registered, the content management apparatus 100A can share metadata assigned by the content management apparatus 100B of another user which is connected via a communication network, and assign shared metadata to each content.

Figure 11A:
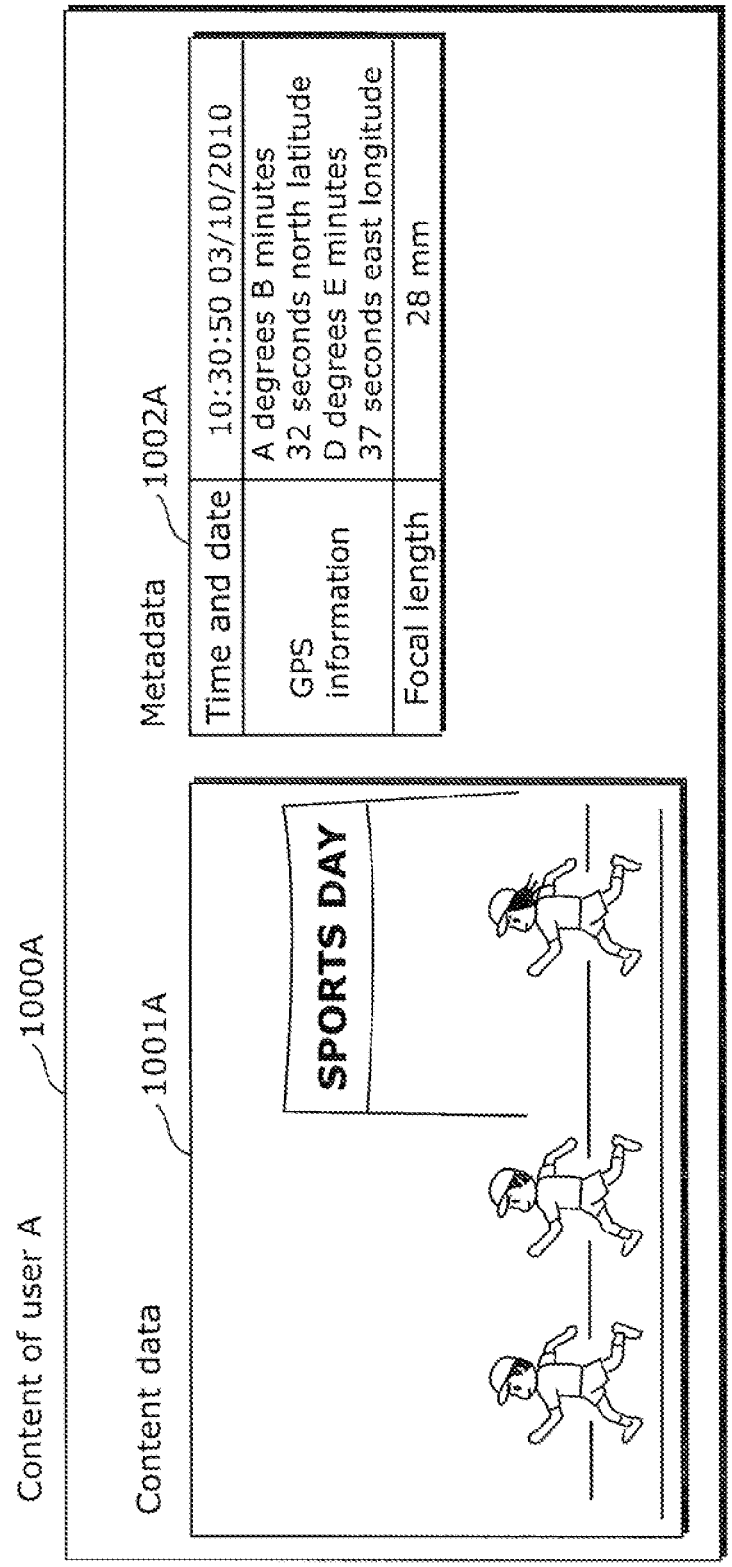
FIG. 11A is a diagram showing a specific example of content.
Figure 11B:
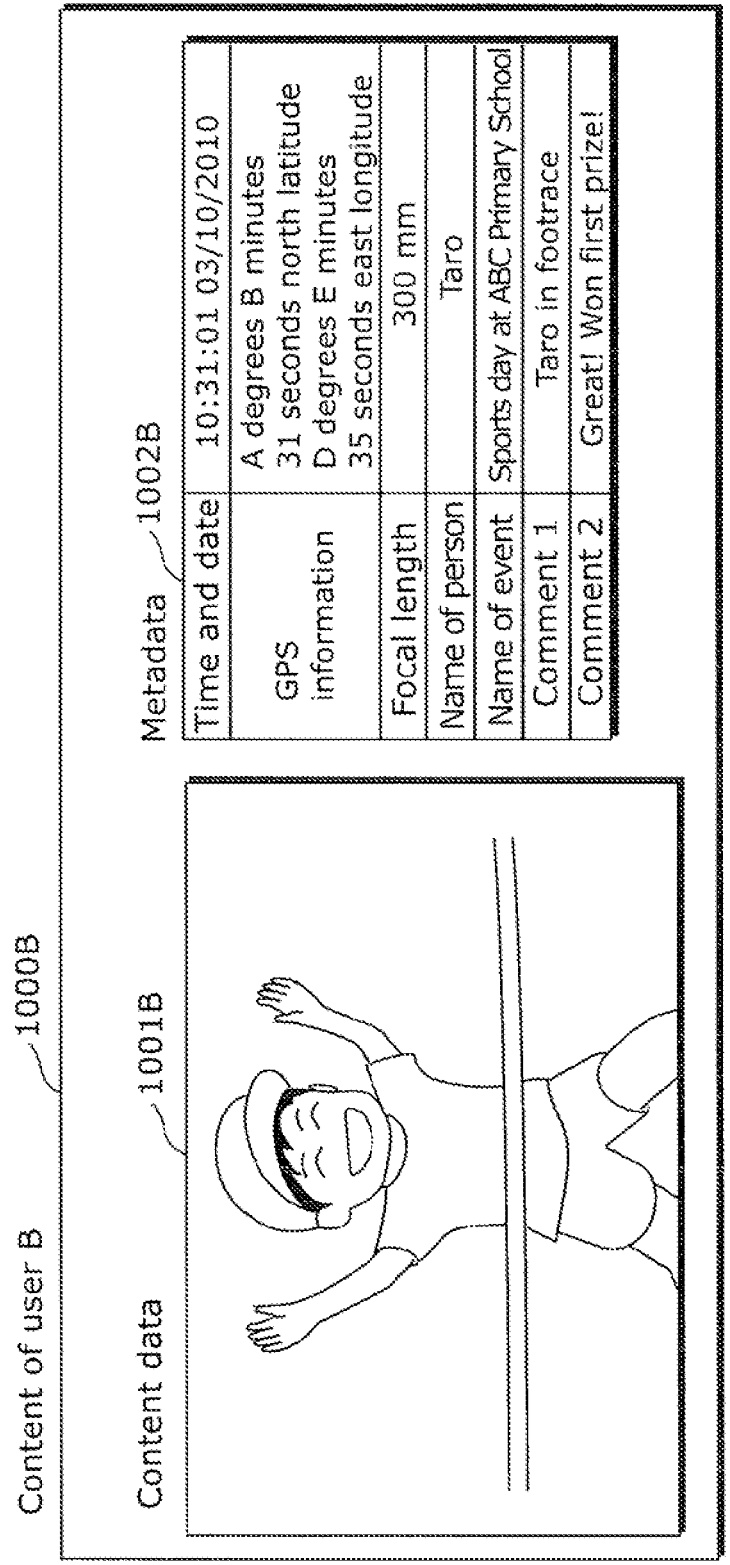
FIG. 11B is a diagram showing another specific example of content.

The above-mentioned operation will be explained in more detail using an example. As shown in FIG. 5, it is assumed that the content management apparatus 100A of the user A and the content management apparatus 100B of the user B are connected via the communication network. FIG. 11A is a diagram showing an example of content 1000A which the user A attempts to register into the content management apparatus 100A. FIG. 11B is a diagram showing an example of content 1000B which is already registered in the content management apparatus 100B of the user B. The content 1000A consists of content data 1001A and metadata 1002A. The metadata 1002A includes metadata elements regarding time and date, GPS information and photographic information which are assigned by a photographing device of the user A (in FIG. 11A, only a metadata element indicating focal length is shown as a representative example of the photographic information). The content 1000B consists of content data 1001B and metadata 1002B. The metadata 1002B includes metadata elements indicating name of person, name of event, and two comments assigned by the user B himself/herself, in addition to the information such as time and date, GPS information and photographic information assigned by a photographing device of the user B. "Taro" which is a name of the user B's child is set for a value of the metadata element indicating name of person, and "Taro" is also set as a part of the value for the metadata element indicating comment 1.

When the user A registers the content 1000A into the content management apparatus 100A, the content data 1001A and the metadata 1002A of the content 1000A are registered into the data storage unit 101A, and also, the metadata 1002A is transmitted to the content management apparatus 100B (S501 and S502 in FIG. 6).

Receiving the metadata 1002A, the content management apparatus 100B searches the data storage unit 101B for the metadata 1002B having time and date and GPS information which are close to the time and date and GPS information included in the metadata 1002A, and transmits, as related metadata, a name of person, a name of event and two comments which are included in the metadata 1002B to the content management apparatus 100A (S503 in FIG. 6).

Figure 11C:
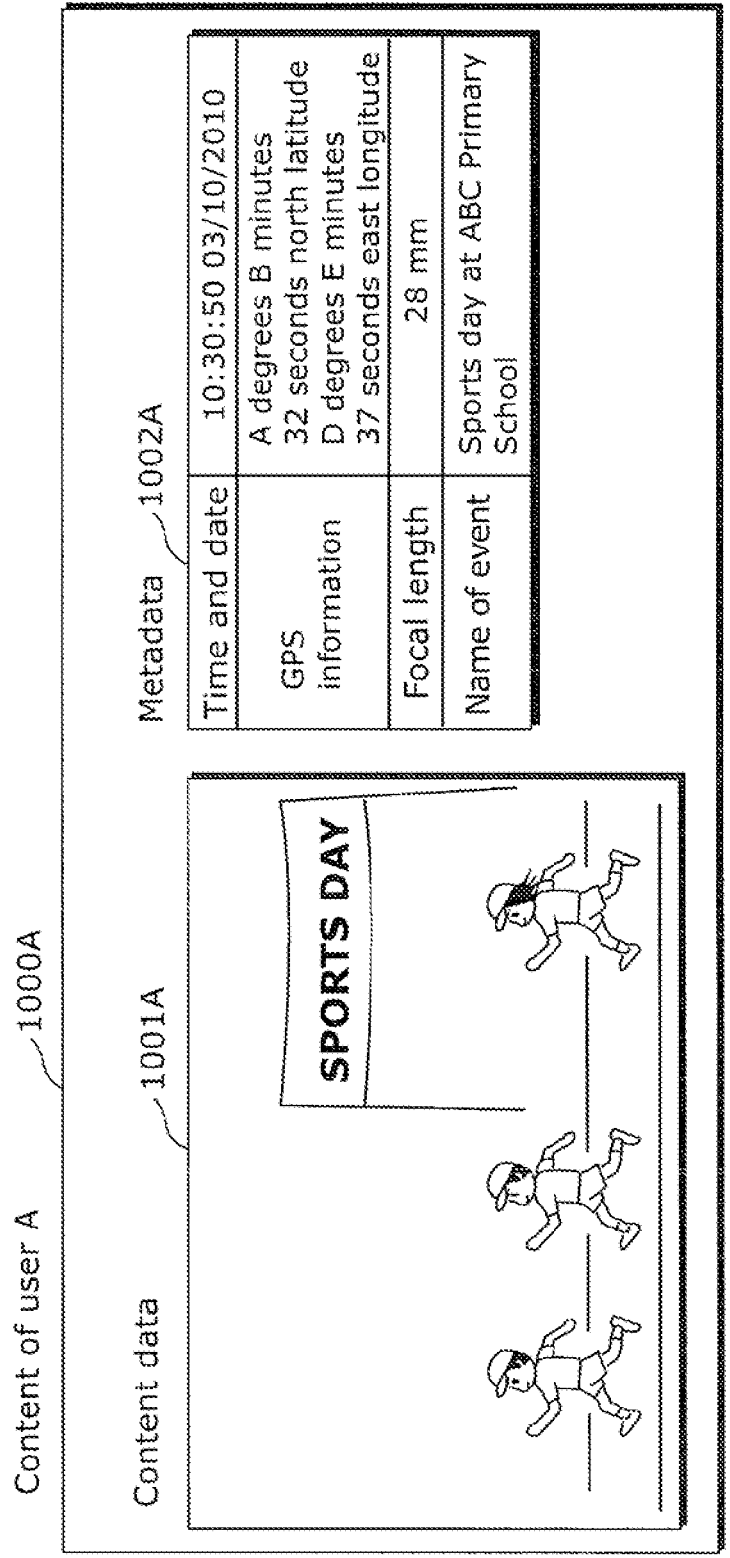
FIG. 11C is a diagram showing another specific example of content.

With the operation performed by the import determination unit 105A, as shown in FIG. 10, the content management apparatus 100A which has received the related metadata imports neither the metadata element indicating name of person nor the metadata element indicating comment 1 of which the value includes the name of person "Taro" stored in the unshared information storage unit 107A nor the metadata element indicating comment 2 of which the value includes the sensitivity word "great" stored in the unshared information storage unit 107A. As a result, the content management apparatus 100A adds the remaining metadata element indicating a name of event "sports day at ABC Primary School" to the metadata element 1002A related to the content data 1001A (from S504 to S506 in FIG. 6), as shown in FIG. 11C.

Thus, the content management apparatus according to the present embodiment does not import, within the metadata stored in another content management apparatus connected via a communication network, the metadata which includes information that is not always useful for sharing, e.g., a name of person, a sensitivity word, etc., and achieves an import of useful metadata excluding the metadata that includes such useless information.

It is described that the dictionaries stored in the unshared information storage unit 107A are used in the import determination for all of the metadata elements. However, a dictionary used for the determination may change according to the type of the metadata element. For example, for the determination on whether or not to import a metadata element of which the type is "name of person", only the name dictionary 401 may be used while the sensitivity word dictionary 402 remains unused. In this way, it becomes possible to perform high-speed import determination by changing the dictionaries used in the import determination for metadata elements, according to the type of the metadata element. The correspondence between the types of metadata elements and the dictionaries used for the import determination may be previously stored in the unshared information storage unit 107.

The unshared information storage unit 107 may store types of the metadata elements which are not desirable for import. For instance, in the case where "comment" is stored in the unshared information storage unit 107 as a type of the metadata elements which are not desirable for import, the import determination unit 105 determines that the metadata element of which the type is "comment" is not importable.

[Embodiment 2]

Figure 12:
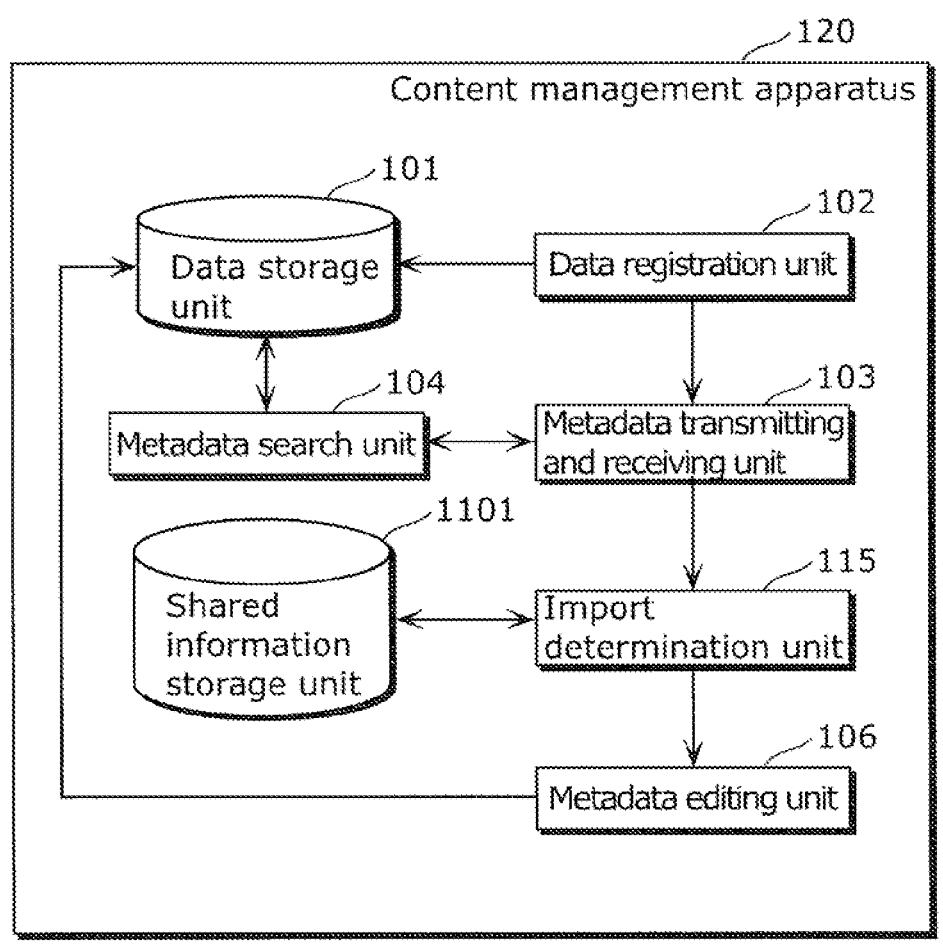
FIG. 12 is a block diagram showing a functional structure of a content management apparatus according to Embodiment 2.

FIG. 12 is a diagram showing a structure of a content management apparatus 120 according to Embodiment 2 of the present invention. The content management apparatus 120 according to the present embodiment prestores information useful for sharing and has a shared information storage unit 1101 instead of the unshared information storage unit 107 as described in Embodiment 1. With the shared information storage unit 1101, the content management apparatus 120 aims to positively import related metadata received from another content management apparatus 120 when the received related metadata includes such useful information. The content management apparatus 120 also includes an import determination unit 115 instead of the import determination unit 105 as described in Embodiment 1. The method used for the import determination by the import determination unit 115 differs from the method used by the import determination unit 105. That is, the import determination unit 115 determines that the metadata useful for sharing is importable and that the metadata other than that is not importable. A detailed explanation on the operation of the import determination unit 115 will be described later. The components except for the shared information storage unit 1101 and the import determination unit 115 are the same as the components described in Embodiment 1; therefore, a detailed description thereof is not repeated here.

Figure 13:
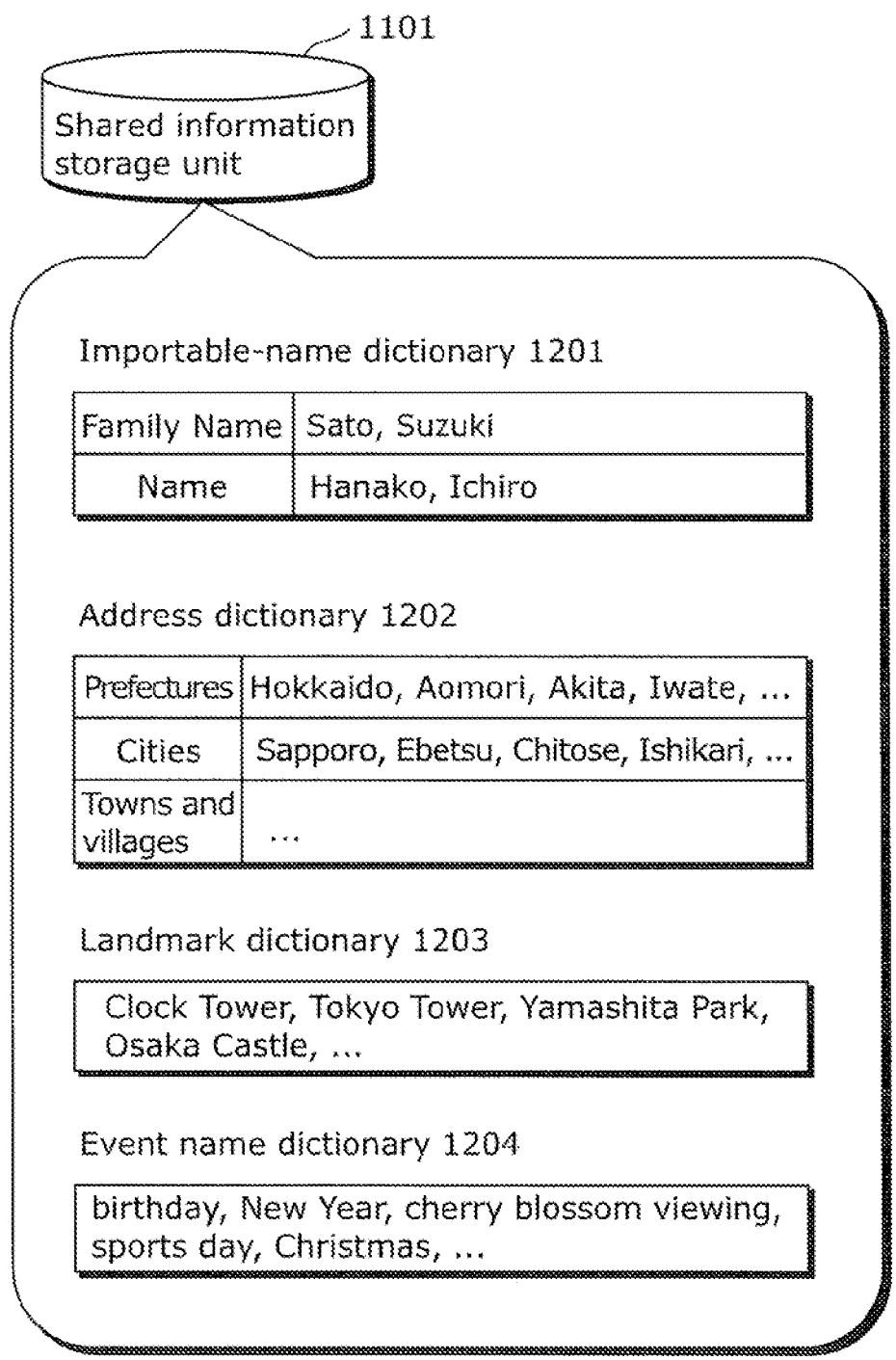
FIG. 13 is a diagram showing examples of dictionaries stored in a shared information storage unit.

FIG. 13 is a diagram showing the dictionaries stored in the shared information storage unit 1101. According to the embodiment, an importable-name dictionary 1201, an address dictionary 1202, a landmark dictionary 1203 and an event name dictionary 1204 are stored in the shared information storage unit 1101. The reasons for such structure is that it is useful to share metadata in the following cases: in the case where one user photographs another user's family member(s) and assigns metadata; in the case of sharing metadata such as an address, a landmark or the like which indicates that the subjects are photographed in the same location; and in the case of sharing metadata which indicates a name of event on the occasion when the users participated in the same event. Thus, it is assumed that a limited number of names such as names of family members, names of persons or the like, with whom the user desires to positively share metadata are registered into the importable-name dictionary 1201 by the user, all the addresses or famous landmarks in Japan and all over the world are registered into the address dictionary 1202 and the landmark dictionary 1203, and the names of annual events (e.g., birthday, New Year, cherry blossom viewing, sports day, Christmas) are registered into the event name dictionary 1204. Since a structure of the dictionary is not a focus of the present invention, a description thereof is omitted here. Note here that the shared information storage unit 1101 may not store plural dictionaries. In other words, the shared information storage unit 1101 may simply store groups of words the user desires to share instead of a dictionary in which the words are categorized.

The following describes the operation of the content management apparatus 120. For descriptive convenience, it is presumed that plural content management apparatuses 120A and 120B are connected via a communication network, as shown in FIG. 14.

Figure 14:
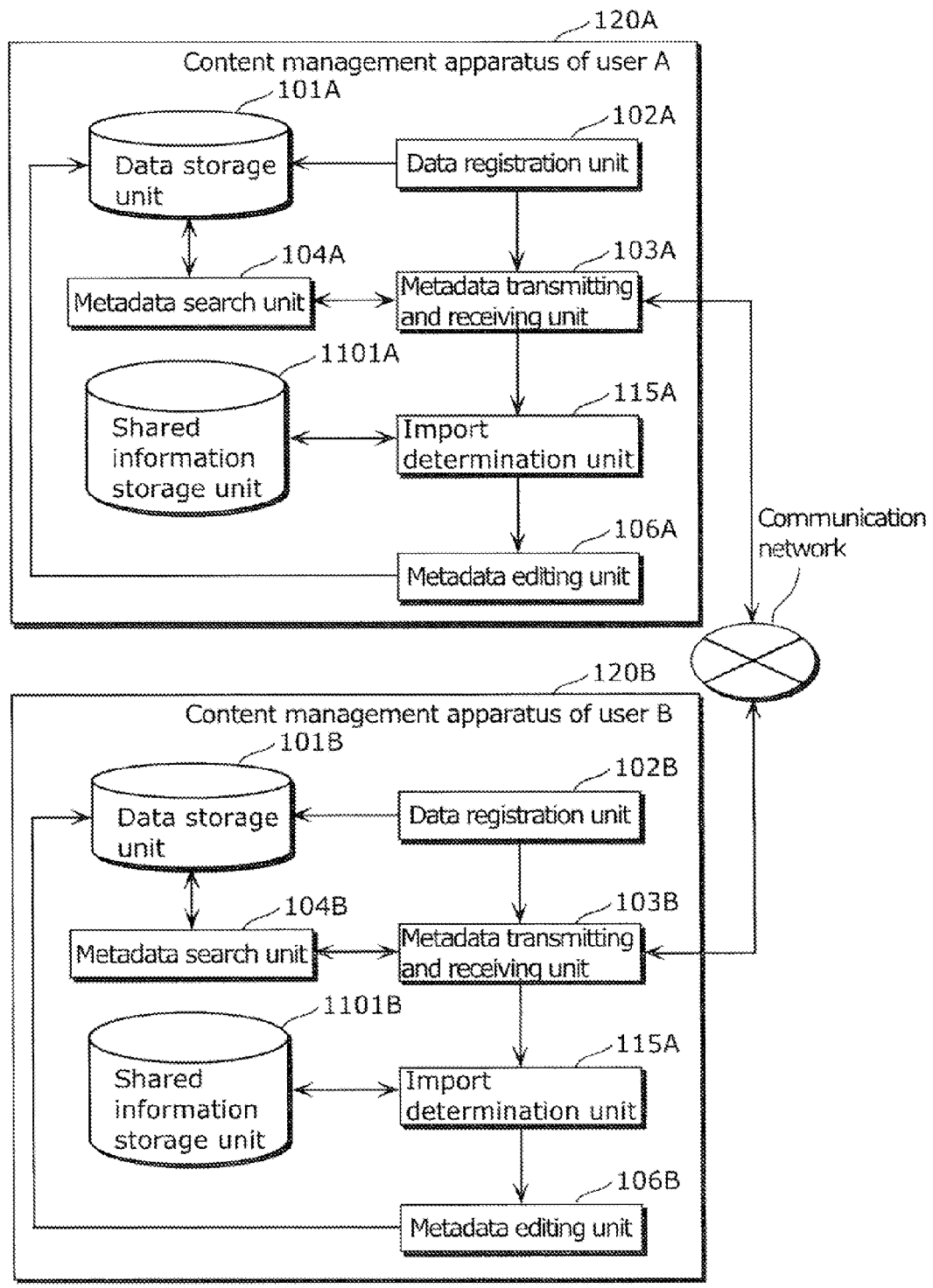
FIG. 14 is a diagram showing a state in which plural content management apparatuses are connected via a network.

FIG. 14 is a diagram showing a structure of the system in which the content management apparatus 120A of the user A and the content management apparatus 120B of the user B are connected via the communication network. Each of the content management apparatuses 120A and 120B has the components as same as the components of the content management apparatus 120 as shown in FIG. 12. In order to distinguish between the components of the content management apparatus 120A and the components of the content management apparatus 120B, a sign "A" is added to the components of the content management apparatus 120A and a sign "B" is added to the components of the content management apparatus 120B. For instance, the data storage unit 101 of the content management apparatus 120A is denoted as "data storage unit 101A" and the data storage unit 101 of the content management apparatus 120B is denoted as "data storage unit 101B".

The whole operation performed by the content management apparatus 120A for registering content is as same as the case described in Embodiment 1. The content management apparatus 120A transmits metadata to another content management apparatus 120B that is connected via the communication network, as shown in FIG. 14, receives related metadata searched by the content management apparatus 120B, determines whether the received related metadata is importable or not by the import determination unit 115A, and updates the existing metadata of the content by the metadata editing unit 106A using the related metadata which has been determined to be importable. The following describes a detailed operation performed by the import determination unit 115A, which is different from the one performed by the import determination unit 105 as described in Embodiment 1.

Figure 15:
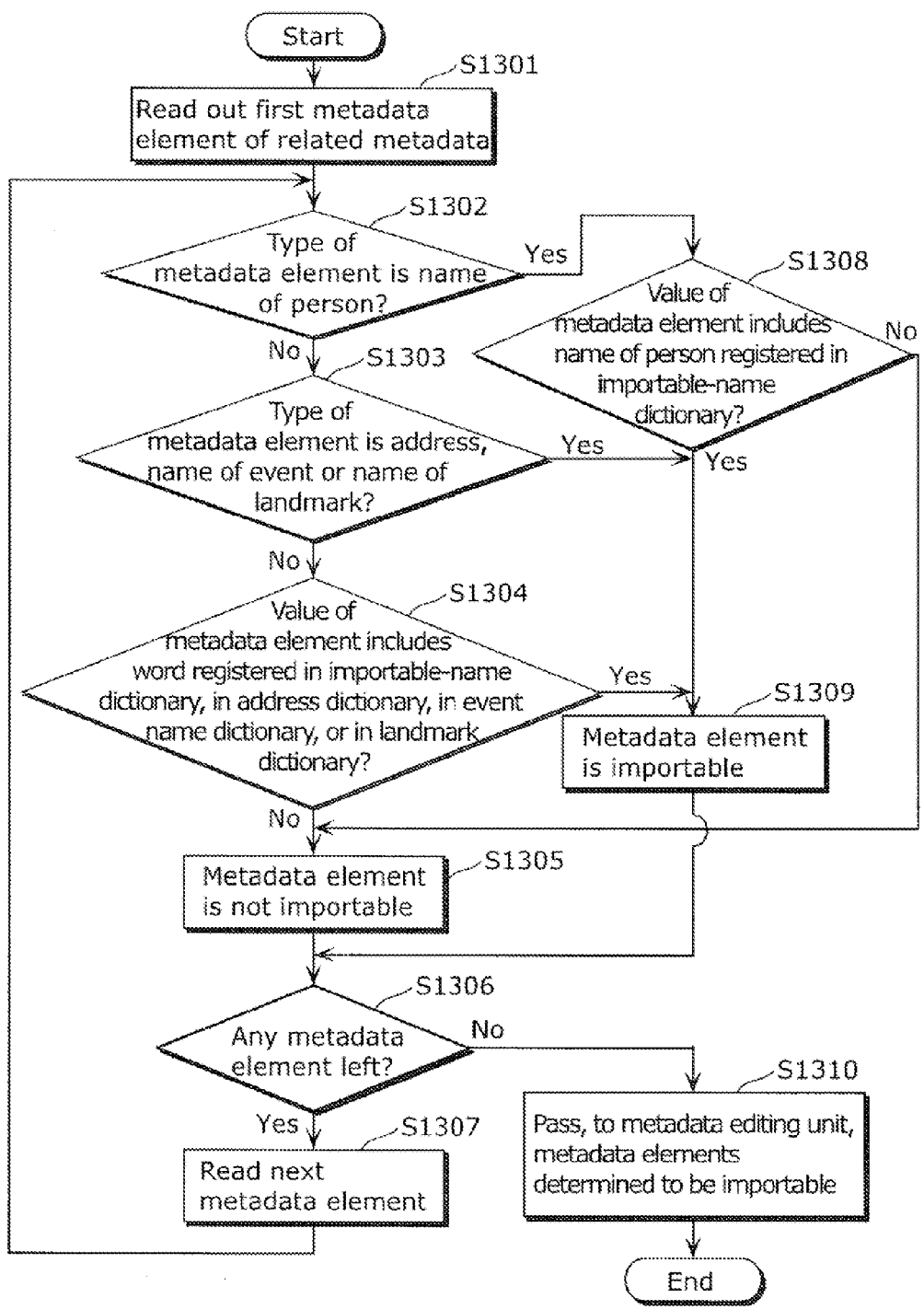
FIG. 15 is a flowchart showing an operation of the import determination unit.

FIG. 15 is a flowchart showing an operation of the import determination unit 115 (115A) according to the present embodiment. The processing shown in FIG. 15 corresponds to the processing of the metadata element import determination (S505 in FIG. 6).

Receiving related metadata from the metadata transmitting and receiving unit 103A, the import determination unit 115A firstly reads the first metadata element from among one or more metadata elements included in the related metadata (S1301).

The import determination unit 115A then examines whether or not a type of the read-out metadata is name of person (S1302), and proceeds to S1303 when the type is not name of person but proceeds to S1308 when the type is name of person. In S1308, the import determination unit 115A examines whether or not a value of the metadata element of which the type is name of person includes a name of person registered in the importable-name dictionary 1201, and proceeds to S1309 when the value includes such name but proceeds to S1305 when the value does not include it.

In S1303, the import determination unit 115A examines whether or not the type of the read-out metadata element is address, name of event, or name of landmark, and proceeds to S1309 when the type is either one of them but proceeds to S1304 when the type is none of them.

In S1304, the import determination unit 115A examines whether or not a value of the read-out metadata element includes a word registered either in the importable-name dictionary 1201, in the address dictionary 1202, in the landmark dictionary 1203 or in the event name dictionary 1204, and proceeds to S1309 when the value includes such word but proceeds to S1305 when the value does not include it.

In S1309, the import determination unit 115A determines that the read-out metadata element is importable, and proceeds to S1306. In S1305, the import determination unit 115A determines that the read-out metadata element is not importable, and proceeds to S1306.

In S1306, the import determination unit 115A examines whether or not there is any remaining metadata element that has not been read, reads the next metadata element if there is any (S1307), and returns to the processing starting from S1302. Not finding any such metadata element, the import determination unit 115A outputs, to the metadata editing unit 106, all the metadata elements that have been determined to be importable (S1310), and ends the processing.

The operation described above will be explained in more detail using an example. As shown in FIG. 14, it is assumed that the content management apparatus 120A of the user A and the content management apparatus 120B of the user B are connected via the communication network. The dictionaries stored in the shared information storage unit 1101A of the content management apparatus 120A are as shown in FIG. 13.

Figure 16B:
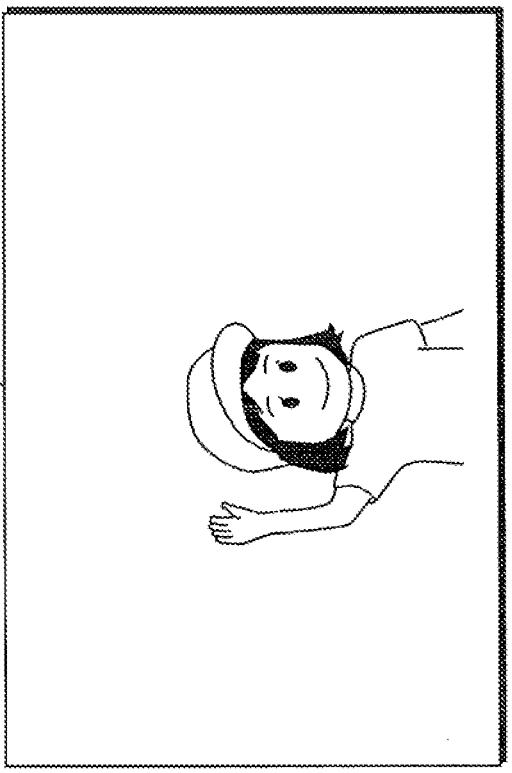
FIG. 16B is a diagram showing another specific example of content.

FIG. 16A is a diagram showing an example of content 1400A which the user A attempts to register into the content management apparatus 120A. FIG. 16B is a diagram showing an example of content 1400B that is already registered in the content management apparatus 120B of the user B. The contents 1400A and 1400B are both photos which show a child of the user A's and are taken in almost the same timing but from different angles. Metadata 1402A includes the metadata elements indicating time and date, GPS information and photographic information assigned by a photographing device of the user A (in FIG. 16A, only a metadata element indicating focal length is shown as a representative example of the photographic information). Metadata 1402B includes the metadata elements indicating name of person, name of event, and comment assigned by the user B himself/herself, in addition to the information such as time and date, GPS information and photographic information assigned by a photographing device of the user B. For a value of the metadata element indicating name of person, "Hanako" which is a name of the user A's child is set.

When the user A registers the content 1400A into the content management apparatus 120A, content data 1401A and the metadata 1402A of the content 1400A are registered into the data storage unit 101A, and also, the metadata 1402A is transmitted to the content management apparatus 120B.

Receiving the metadata 1402A, the content management apparatus 120B searches the data storage unit 101B for the metadata 1402B having time and date and GPS information which are close to the time and date and GPS information included in the metadata 1402A, and transmits, as related metadata, a name of person, a name of event and a comment which are included in the metadata 1402B to the content management apparatus 120A.

Figure 16C:
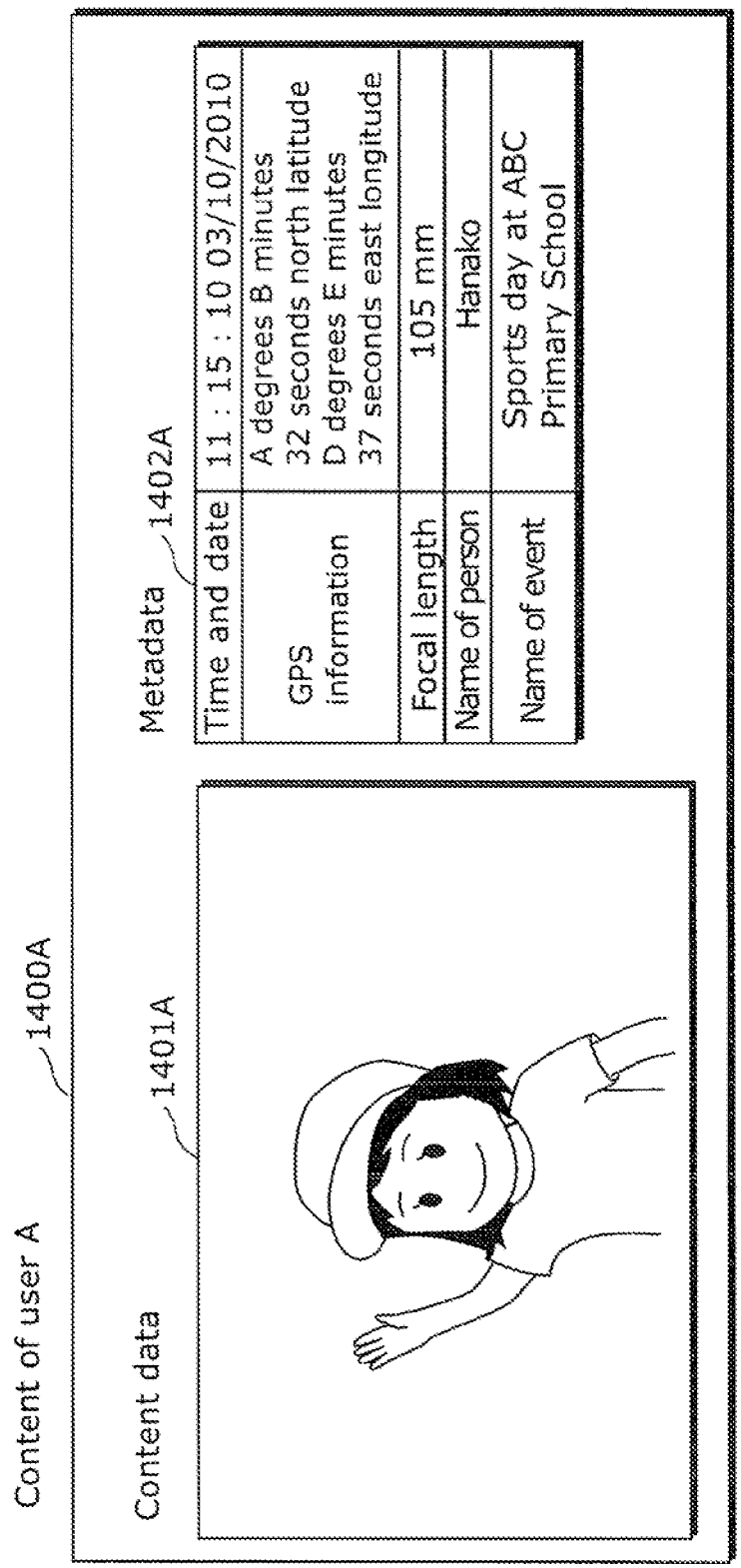
FIG. 16C is a diagram showing another specific example of content.

With the operation performed by the import determination unit 115A, as shown in FIG. 15, the content management apparatus 120A which has received the related metadata adds, to the metadata 1402A related to the content data 1401A, the metadata element indicating name of person which includes the value "Hanako" that is registered in the importable-name dictionary 1201 and the metadata element of which the type is name of event (the value "Big smile!" of the metadata element indicating comment does not include a value stored in any of the dictionaries in the shared information storage unit 1101A, and thus the metadata element of the value "Big smile!" is determined to be not importable), as shown in FIG. 16C.

Thus, the content management apparatus of the present embodiment previously holds information useful for sharing. Within the metadata stored in another content management apparatus connected via a communication network, the content management apparatus achieves to actively import related metadata received from another content management apparatus when the related metadata includes such useful information, and also achieves not to import the metadata which includes information other than that, namely, information that is not always useful.

It is described that the dictionaries stored in the shared information storage unit 1101 are used in the import determination for all the metadata elements. However, a dictionary used for the determination may change according to the type of the metadata element. For example, for the determination on whether or not to import a metadata element of which the type is "name of person", only the importable-name dictionary 1201 may be used while the address dictionary 1202, the landmark dictionary 1203, and the event name dictionary 1204 remain unused. In this way, it becomes possible to perform high-speed import determination by changing the dictionaries used in the import determination for metadata elements, according to the type of the metadata element. The correspondence between the types of metadata elements and the dictionaries used for the import determination may be previously stored in the shared information storage unit 1101.

The shared information storage unit 1101 may store types of the metadata elements which the user desires to actively import. For example, in the case where the shared information storage 1101 stores "comment" as a type of the metadata element that the user desires to actively import, the import determination unit 115 determines that a metadata element of which the type is "comment" is always importable.

[Embodiment 3]

Figure 17:
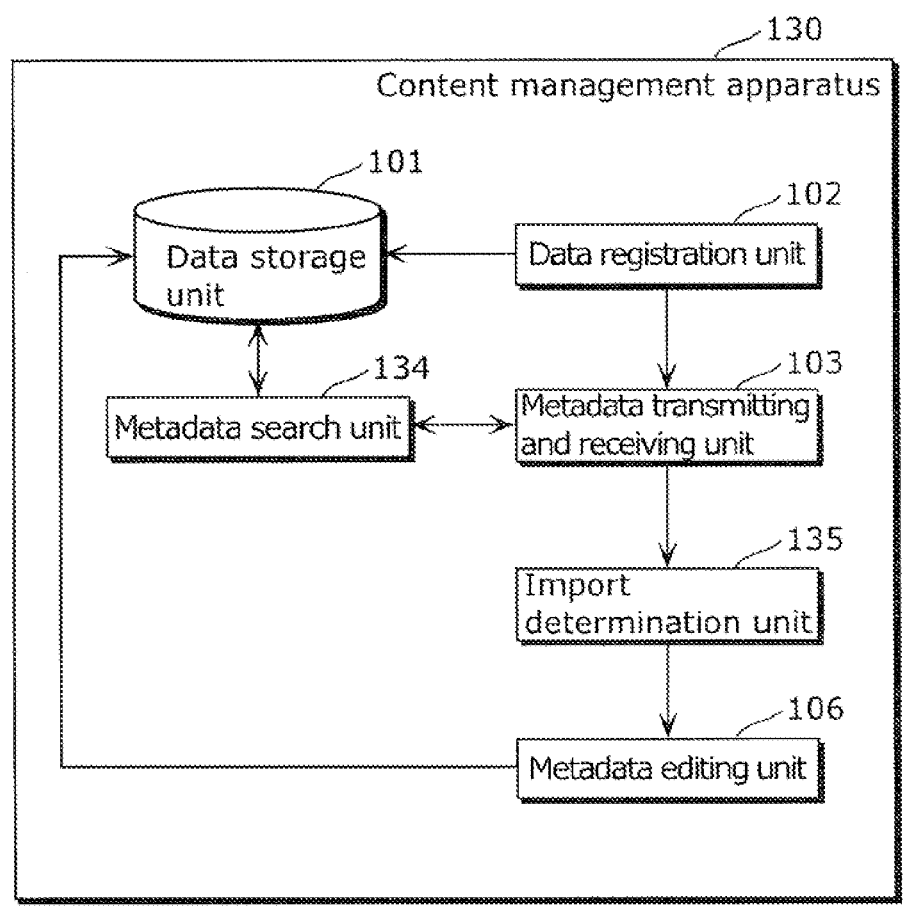
FIG. 17 is a block diagram showing a functional structure of a content management apparatus according to Embodiment 3.

FIG. 17 is a diagram showing a structure of a content management apparatus 130 according to Embodiment 3 of the present invention. The content management apparatus 130 according to the present embodiment assigns useful metadata by presuming a user's intention of photographing based on photographic information and determining, based on the presumption, whether or not metadata is importable. More precisely, the content management apparatus 130 examines a value of the metadata element regarding a focal length, within metadata of content, and presumes that the user has an intention to photograph a whole scene in front of the user when the focal length is set within a wide angle zoom range, but presumes that the user has an intention to take a photo of a specific subject when the focal length is set within a telephoto zoom range. In order to achieve these functions, the content management apparatus 130 has the data storage unit 101, the data registration unit 102, the metadata transmitting and receiving unit 103, a metadata search unit 134, an import determination unit 135, and the metadata editing unit 106. The detailed operations performed by the metadata search unit 134 and the import determination unit 135 will be explained later. The components except for the metadata search unit 134 and the import determination unit 135 are the same as the components described in Embodiment 1, therefore, a detailed description thereof is not repeated here.

The following describes the operation of the content management apparatus 130. For descriptive convenience, it is assumed that plural content management apparatuses 130A and 130B are connected via a communication network, as shown in FIG. 18.

Figure 18:
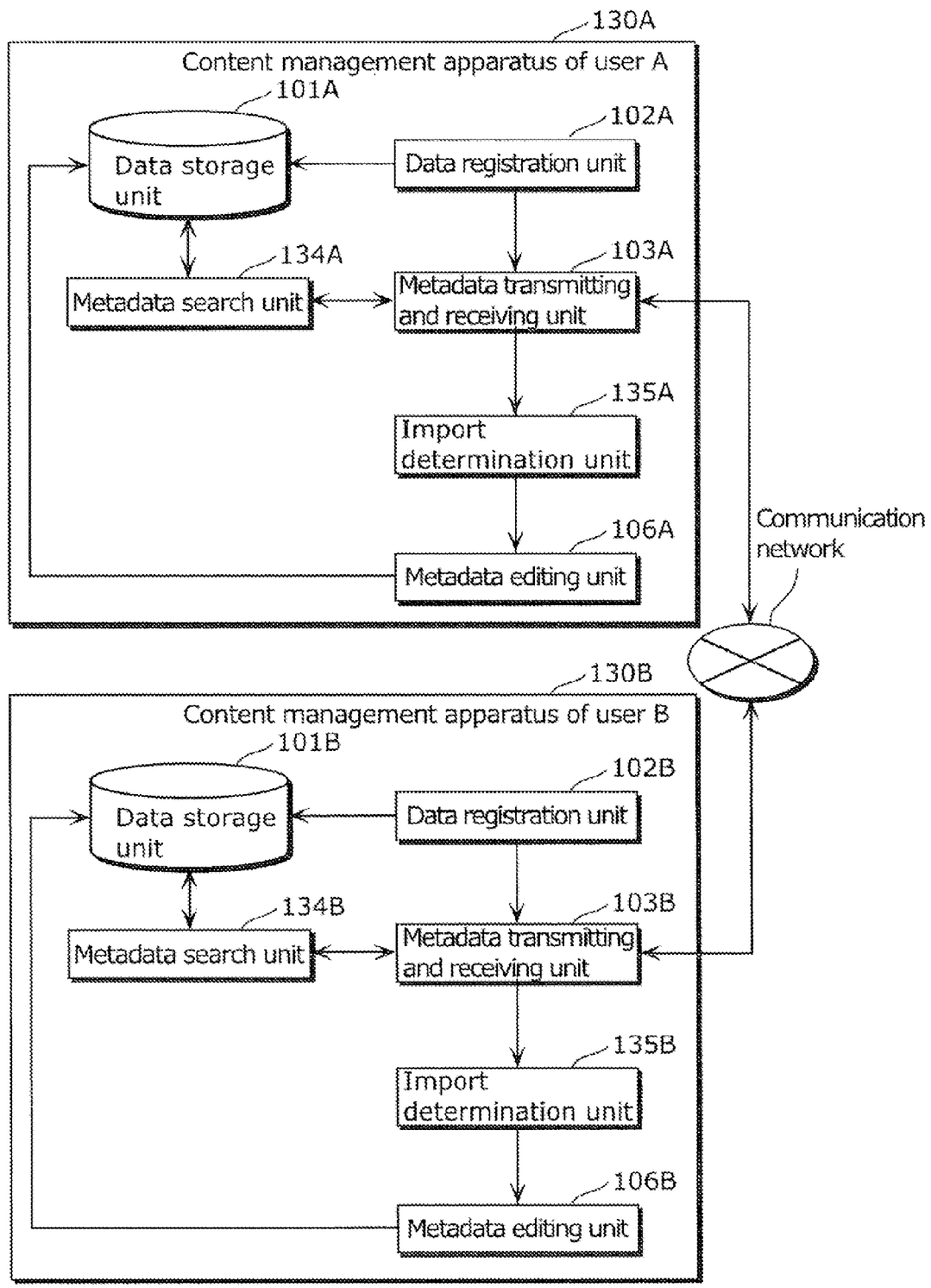
FIG. 18 is a diagram showing a state in which plural content management apparatuses are connected via a network.

FIG. 18 is a diagram showing a system in which the content management apparatus 130A of the user A and the content management apparatus 130B of the user B are connected via the communication network. Each of the content management apparatuses 130A and 130B has the same components as the components of the content management apparatus 130 shown in FIG. 17. In order to distinguish between the components of the content management apparatus 130A and the components of the content management apparatus 130B, a sign "A" is added to the components of the content management apparatus 130A and a sign "B" is added to the components of the content management apparatus 130B. For instance, the data storage unit 101 of the content management apparatus 130A is denoted as "data storage unit 101A" and the data storage unit 101 of the content management apparatus 130B is denoted as "data storage unit 101B".

The whole operation performed by the content management apparatus 130A for registering content is as same as the case described in Embodiment 1. The content management apparatus 130A transmits metadata to another content management apparatus 130B that is connected via the communication network, as shown in FIG. 18, receives related metadata searched by the content management apparatus 130B, determines whether the received related metadata is importable or not by the import determination unit 135A, and updates the existing metadata of the content by the metadata editing unit 106A using the related metadata which has been determined to be importable. The following describes the detailed operations performed by the metadata search unit 134A and the import determination unit 135A which are respectively different from those performed by the metadata search unit 104 and the import determination unit 105 as described in Embodiment 1.

Figure 19:
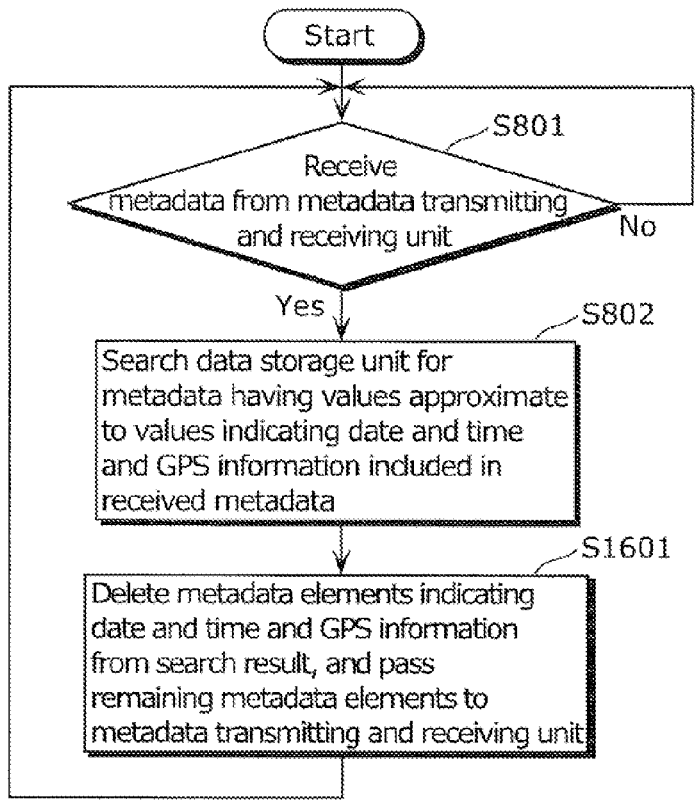
FIG. 19 is a flowchart showing an operation of the metadata search unit.

FIG. 19 is a flowchart showing an operation performed by the metadata search unit 134B of the content management apparatus 130B. The processing shown in FIG. 19 corresponds to the processing of the related metadata search (S503 in FIG. 6).

The metadata search unit 134B receives metadata from the metadata transmitting and receiving unit 103B (S801), and searches the data storage unit 101B for the metadata that includes time and date and GPS information, of which the values are close to the values of the metadata elements indicating time and date and GPS information which are included in the received metadata (S802). The processing shown in S801 and S802 are the same as S801 and S802 as described with reference to FIG. 9 in Embodiments 1 and 2.

The metadata search unit 134B, then, does not delete the metadata element indicating photographic information but deletes the metadata elements indicating time and date and GPS information from the metadata which is a result of the search, and outputs the remaining metadata elements as related metadata to the metadata transmitting and receiving unit 103B (S1601). Note that, according to Embodiments 1 and 2, it is described that the metadata elements indicating time and date, GPS information and photographic information are deleted from the metadata which is a result of the search while the remaining metadata elements are outputted to the metadata transmitting and receiving unit 103B as related metadata (S803 in FIG. 9), however, the present embodiment differs from Embodiments 1 and 2 in that photographic information is outputted to the metadata transmitting and receiving unit 103B.

Figure 20:
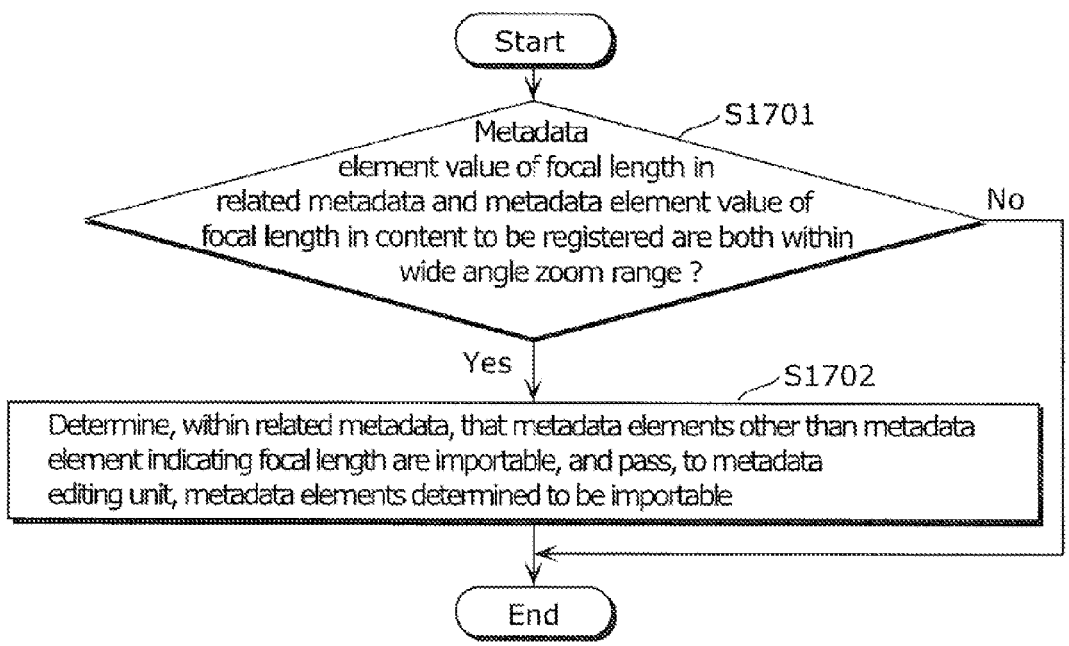
FIG. 20 is a flowchart showing an operation of the import determination unit.

FIG. 20 is a flowchart showing an operation of the import determination unit 135A (135) according to the present embodiment. The processing described in FIG. 20 corresponds to the processing of the metadata element import determination (S505 in FIG. 6).

Receiving related metadata from the metadata transmitting and receiving unit 103A, the import determination unit 135A examines whether or not the following values: a value of the metadata element which indicates focal length and is included in the related metadata; and a value of the metadata element indicating focal length, of the content that is to be registered into the content management apparatus 130A, are set within a wide angle zoom range (S1701). Here, the term "are set within a wide angle zoom range" means that a value of focal length indicates a value equal to or smaller than a predetermined value (e.g., 50 mm). In the case where both of the values of focal length are set within the wide angle zoom range, the import determination unit 135A determines that the metadata elements indicating information other than focal length is importable within the metadata elements included in the related metadata, and outputs, to the metadata editing unit 106A, the metadata elements indicating information other than focal length (S1702). In the case where either of the values of focal length is not set within the wide angle zoom range, the import determination unit 135A outputs nothing to the metadata editing unit 106A (i.e., does not perform an import of the related metadata) and ends the processing. The reason for executing such processing is that it is under high possibility that, for content that is a zoomed-out shot, metadata describing a scene or a situation is assigned to the content; therefore, sharing of the metadata is useful. It is also highly possible that, for content that is a zoomed-in shot, metadata describing a specific subject is assigned to the content; therefore, sharing of the metadata is not always useful.

Figure 21A:
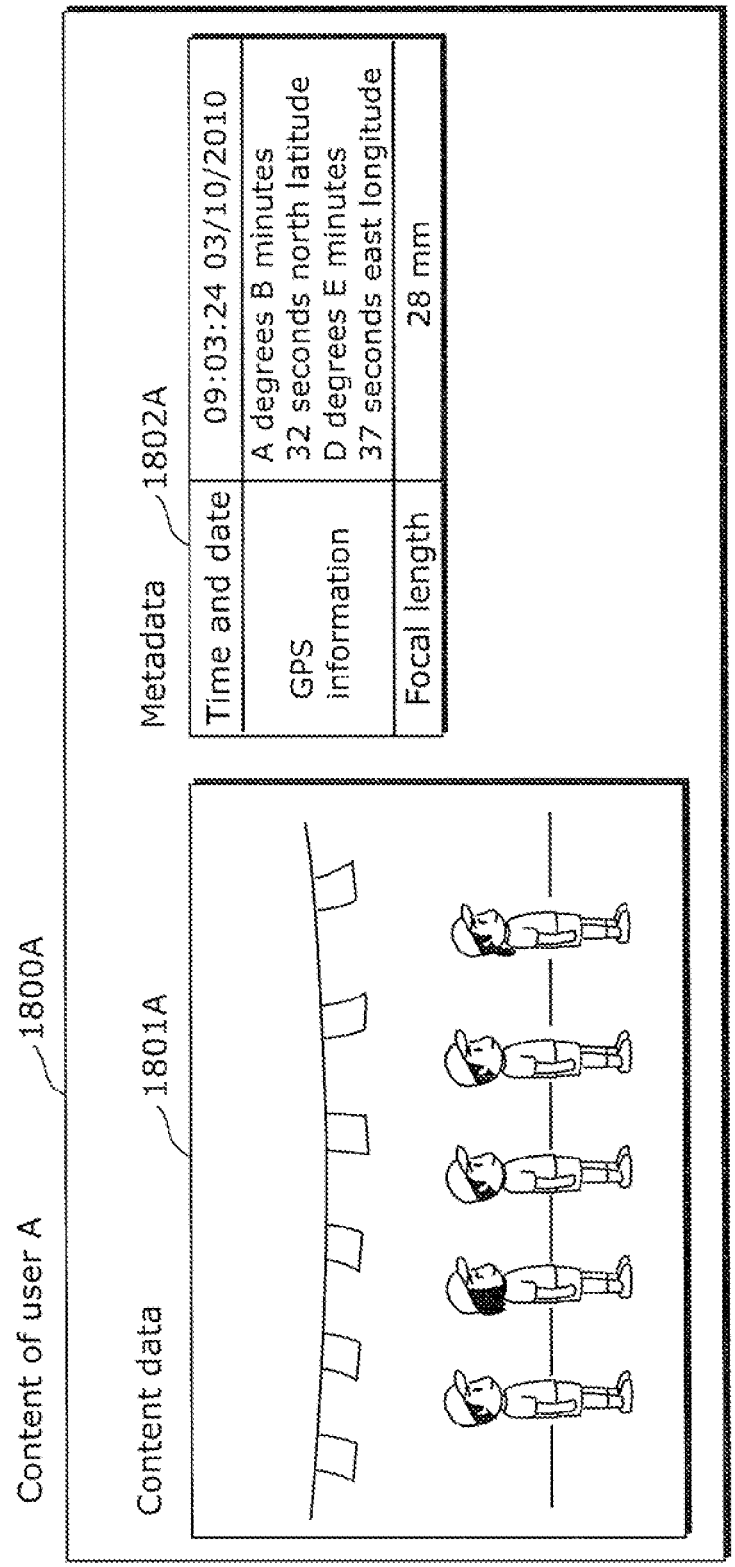
FIG. 21A is a diagram showing a specific example of content.
Figure 21B:
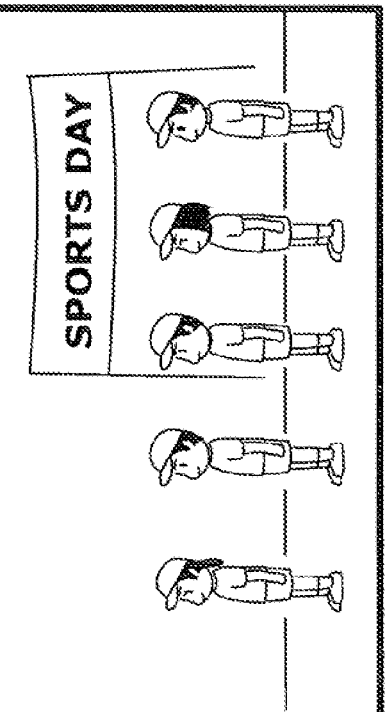
FIG. 21B is a diagram showing another specific example of content.

The operation described above will be explained in more detail using an example. As shown in FIG. 18, it is assumed that the content management apparatus 130A of the user A and the content management apparatus 130B of the user B are connected via the communication network. FIG. 21A is a diagram showing an example of content 1800A the user A attempts to register into the content management apparatus 130A. FIG. 21B is a diagram showing an example of content 1800B that is already registered in the content management apparatus 130B of the user B. The content 1800A consists of content data 1801A and metadata 1802A. The metadata 1802A includes the metadata elements indicating time and date, GPS information and photographic information assigned by the photographing device of the user A (in FIG. 21A, only a metadata element indicating focal length is shown as a representative example of the photographic information). The content 1800B consists of content data 1801B and metadata 1802B. The metadata 1802B includes the metadata elements indicating name of event and comment assigned by the user B himself/herself, in addition to the time and date, GPS information and photographic information assigned by the photographing device of the user B. For a value of the metadata element indicating name of event, "sports day at ABC Primary School" is set, and for a value of the metadata element indicating comment, "opening ceremony" is set. The content data 1801A and 1801B are the images which are both photographed in an opening ceremony on a sports day, and are both zoomed-out shots as the focal lengths are respectively 28 mm and 35 mm which are shorter than 50 mm.

When the user A registers the content 1800A into the content management apparatus 130A, the content data 1801A and the metadata 1802A of the content 1800A are registered into the data storage unit 101A, and also, the metadata 1802A is transmitted to the content management apparatus 130B.

Receiving the metadata 1802A, the content management apparatus 130B searches the data storage unit 101B for the metadata 1802B having time and date and GPS information which are close to the time and date and GPS information included in the metadata 1802A, and transmits, as related metadata to the content management apparatus 130A, the metadata elements indicating focal length, name of event and comment which are the results of excluding the metadata elements indicating date and time and GPS information from the metadata 1802B.

Figure 21C:
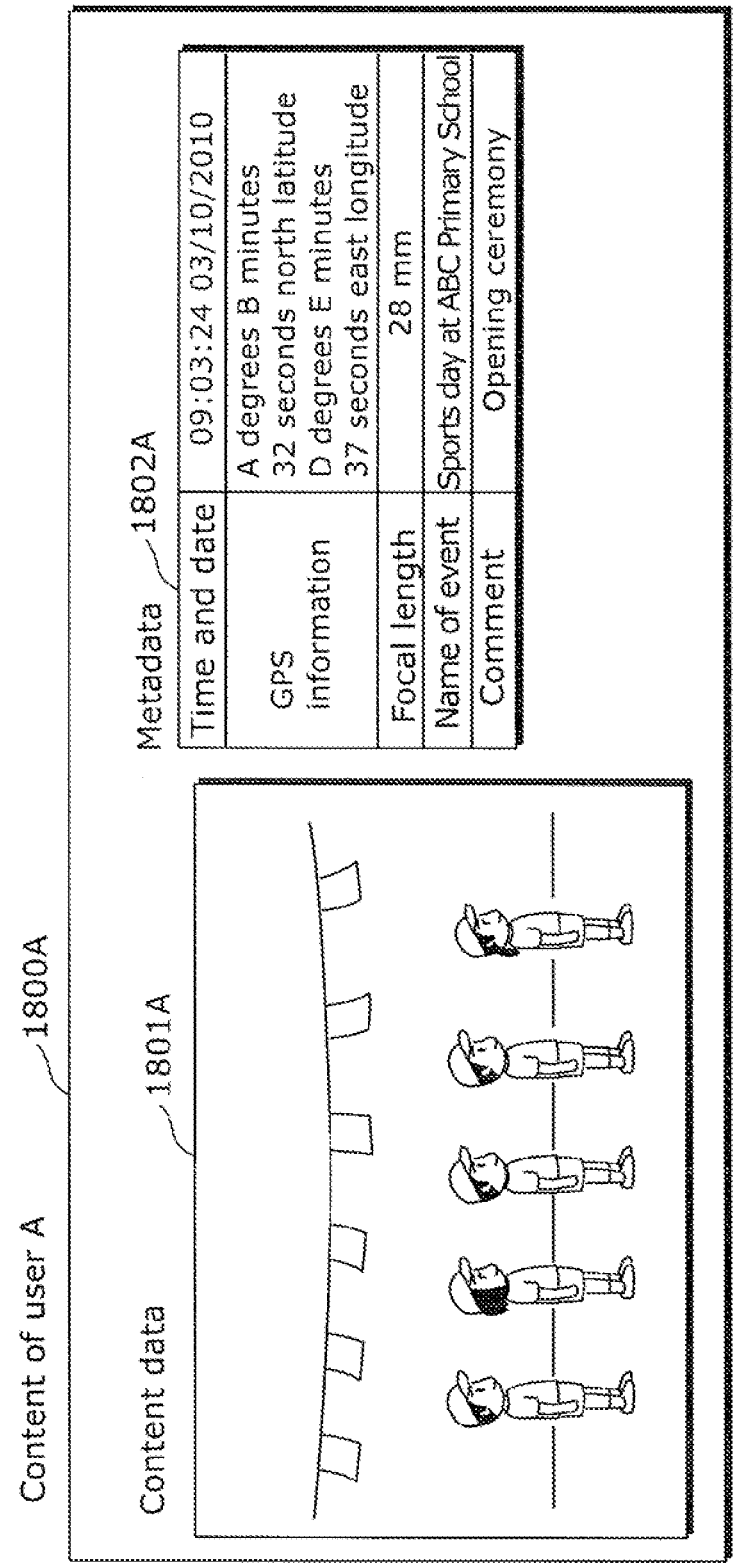
FIG. 21C is a diagram showing another specific example of content.

With the operation performed by the import determination unit 135A, as shown in FIG. 20, the content management apparatus 130A which has received the related metadata determines that the focal length (35 mm) included in the related metadata and the focal length (28 mm) included in the metadata 1802A are set within the wide angle zoom range as they both indicate a value smaller than the predetermined value (e.g., 50 mm). Then, the content management apparatus 130A adds, to the metadata 1802A related to the content data 1801A, the metadata elements indicating information other than focal length within the related metadata, as shown in FIG. 21C. In other words, the content management apparatus 130A adds the metadata elements indicating name of event and comment to the metadata 1802A related to the content data 1801A.

Here, the operation as described above performed using the contents 1000A and 1000B respectively shown in FIGS. 11A and 11B will be focused. The content 1000A is an image photographed by the user A for photographing a footrace and is a zoomed-out shot (28 mm in this example) for photographing a wide view. The content 1000B shows a same scene of footrace, but is a zoomed-in shot (300 mm in this example) taken by the user B for photographing his/her child. The content management apparatus 130A receives the metadata 1002B as related metadata from the content management apparatus 130B. However, the content management apparatus 130A does not import the related metadata because a value of the metadata element, which indicates focal length and is included in the related metadata, is 300 mm that goes beyond the predetermined value (e.g., 50 mm).

In this way, the content management apparatus according to the present embodiment achieves to assign useful metadata with high accuracy by presuming, based on photographic information, a user's intention of photographing a subject, and determining, based on the presumption, whether the metadata held by another content management apparatus is importable or not. Thus, it is possible to prevent an import of unnecessary metadata and achieve an import of useful metadata.

[Embodiment 4]

In Embodiment 3, an import of related metadata is performed only in the case where a value of the metadata element indicating focal length included in the metadata of the content held by the content management apparatus on the side of transmitting metadata and a value of the metadata element indicating focal length included in received related metadata are set within a wide angle zoom range. In addition to this, the content management apparatus according to Embodiment 4 imports related metadata also in the case where it is determined that content held by the content management apparatus on the metadata transmitting side and content of the related metadata are both zoomed-in shots and show same faces. It is possible to determine that images are photographed with an intention to photograph a same subject when same faces appear in the images because it is presumed that the user has an intention to photograph a specific subject when content is a zoomed-in shot, as has already been described in Embodiment 3.

The structure of the content management apparatus 130 according to the present embodiment is the same as the one shown in FIG. 17, and the operation of the content management apparatus 130 is the same as the case described in Embodiment 3 for the most of the part. The following is a description of the operations performed by the data registration unit 102 and the import determination unit 135, which are different from the operations described in Embodiment 3.

As is the same as described in Embodiment 3, it is assumed in the present embodiment that plural content management apparatuses 130A and 130B are connected via the communication network, as shown in FIG. 18.

When registering content 200, the data registration unit 102 examines whether or not a human face appears in content data 201. In the case where a human face appears in the content data 201, the data registration unit 102 extracts a facial feature value of the human face, sets the extracted facial feature value as a value of a metadata element of which the type is facial feature value, and adds it to metadata 202. The data registration unit 102 then registers the content data 201 and the metadata 202 into the data storage unit 101, and also outputs the metadata 202 to the metadata transmitting and receiving unit 103. The technology of the facial feature value extraction for extracting a facial feature value of a human face and the technology of face region detection for examining whether or not a human face appears in the content data 201 are common knowledge; therefore, the descriptions thereof are omitted here. For instance, a distance between the eyes or a width of the nose, or a feature value of a pattern distribution such as a color of the face, shading in the face or the like may be used as a facial feature value. By inputting such feature value, the detection of a face region may be performed using a classifier such as an SVM (Support Vector Machine), an Adaboost or the like.

Figure 22:
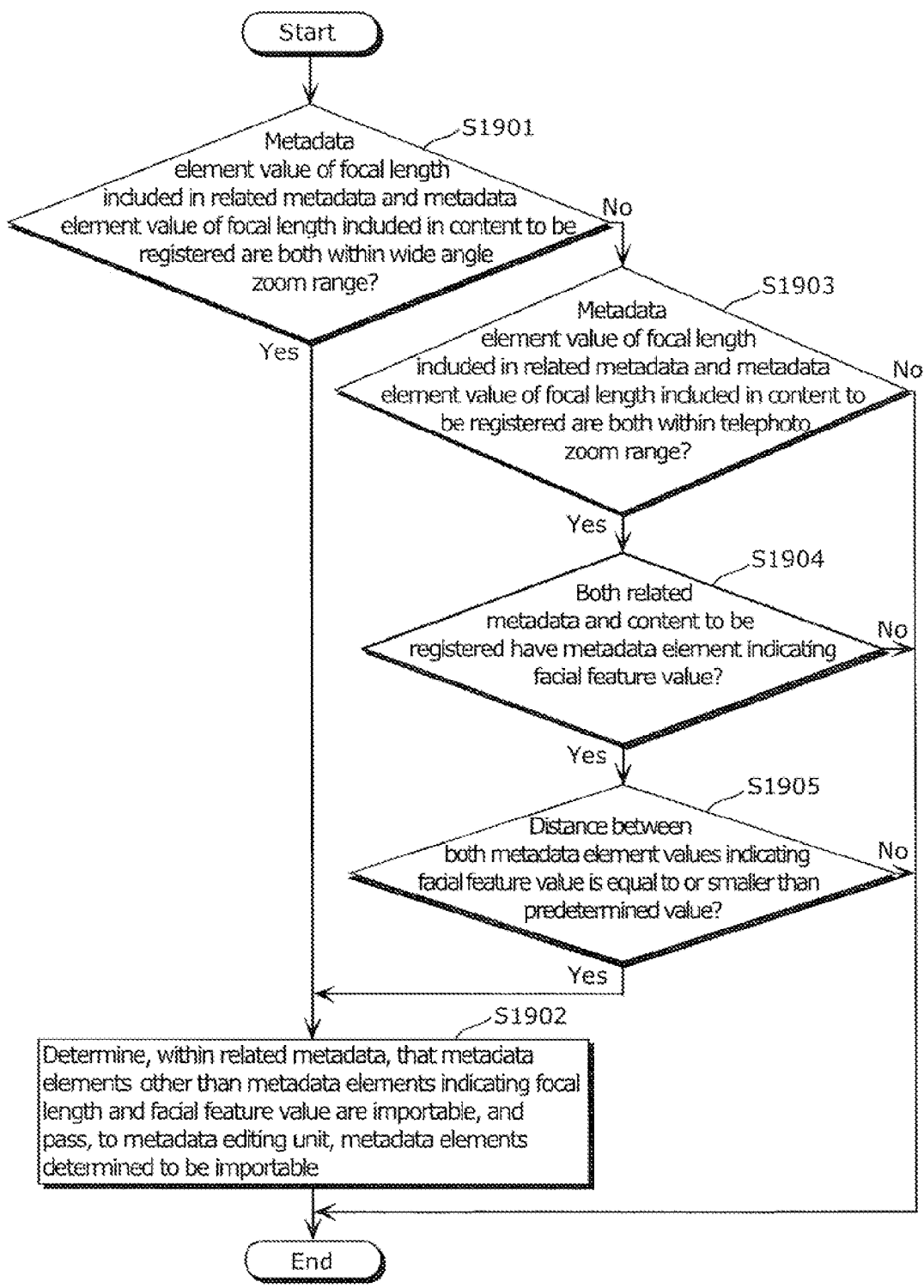
FIG. 22 is a flowchart showing an operation of the import determination unit according to Embodiment 4.

FIG. 22 is a flowchart showing an operation of the import determination unit 135A (135) according to the present embodiment. The processing shown in FIG. 22 corresponds to the processing of the metadata element import determination (S505 in FIG. 6).

Receiving related metadata from the metadata transmitting and receiving unit 103A, the import determination unit 135A examines whether or not a value of the metadata element which indicates focal length and is included in the related metadata and a value of the metadata element indicating focal length of content that is to be registered into the content management apparatus 130 are both set within a wide angle zoom range (S1901). Here, the term "are set within a wide angle zoom range" means that a value indicating focal length is equal to or smaller than a predetermined value (e.g., 50 mm). In the case where both of the values of focal length are set within the wide angle zoom range (Yes in S1901), the import determination unit 135A determines that the metadata elements indicating information other than focal length and facial feature value (in the case where a metadata element indicating facial feature value is assigned by the data registration unit 102) is importable within the metadata elements included in the related metadata, and outputs the metadata elements indicating information other than focal length and facial feature value to the metadata editing unit 106A (S1902).

In the case where either a value of the metadata element indicating focal length included in the related metadata or a value of the metadata element indicating focal length of the content that is to be registered is not set within the wide angle zoom range (No in S1901), the import determination unit 135A then examines whether or not both of the values are set within a telephoto zoom range (S1903). Here the term "are set within a telephoto zoom range" means that a value indicating focal length is larger than a predetermined value (e.g., 50 mm). In the case where one value is set within the wide angle zoom range and the other value is set within the telephoto zoom range (No in S1903), the import determination unit 135A ends the processing. In the case where both of the values are set within the telephoto zoom range (Yes in S1903), the import determination unit 135A examines whether or not both of the related metadata and the content to be registered have a metadata element indicating facial feature value (S1904). In the case where neither the related metadata nor the content to be registered has any such metadata element (No in S1904), the import determination unit 135A ends the processing.

In the case where both of the related metadata and the content to be registered have a metadata element indicating facial feature value (Yes in S1904), the import determination unit 135A performs distance calculation between the values of the both metadata elements indicating facial feature value, and determines whether the result indicates a value that is within a predetermined value (small enough to determine that the faces are same) (S1905). In the case where a facial feature value is represented using vectorial representation, the distance may be calculated by obtaining a Euclidean distance between the vectors, and in the case where a facial feature value is represented using scalar representation, the distance may be calculated by obtaining a difference absolute value between the facial feature values. Nevertheless, the method for the distance calculation is not limited to these.

When the result of calculation between the values of the metadata elements indicating facial feature value is within the predetermined range (Yes in S1905), the import determination unit 135A determines, within the metadata elements included in the related metadata, that the metadata elements which indicate information other than focal length and facial feature value is importable and outputs the metadata elements indicating the information other than focal length and facial feature value to the metadata editing unit 106A (S1902). When the result of the calculation indicates a value larger than the predetermined value (No in S1905), the import determination unit 135A ends the processing.

Figure 23A:
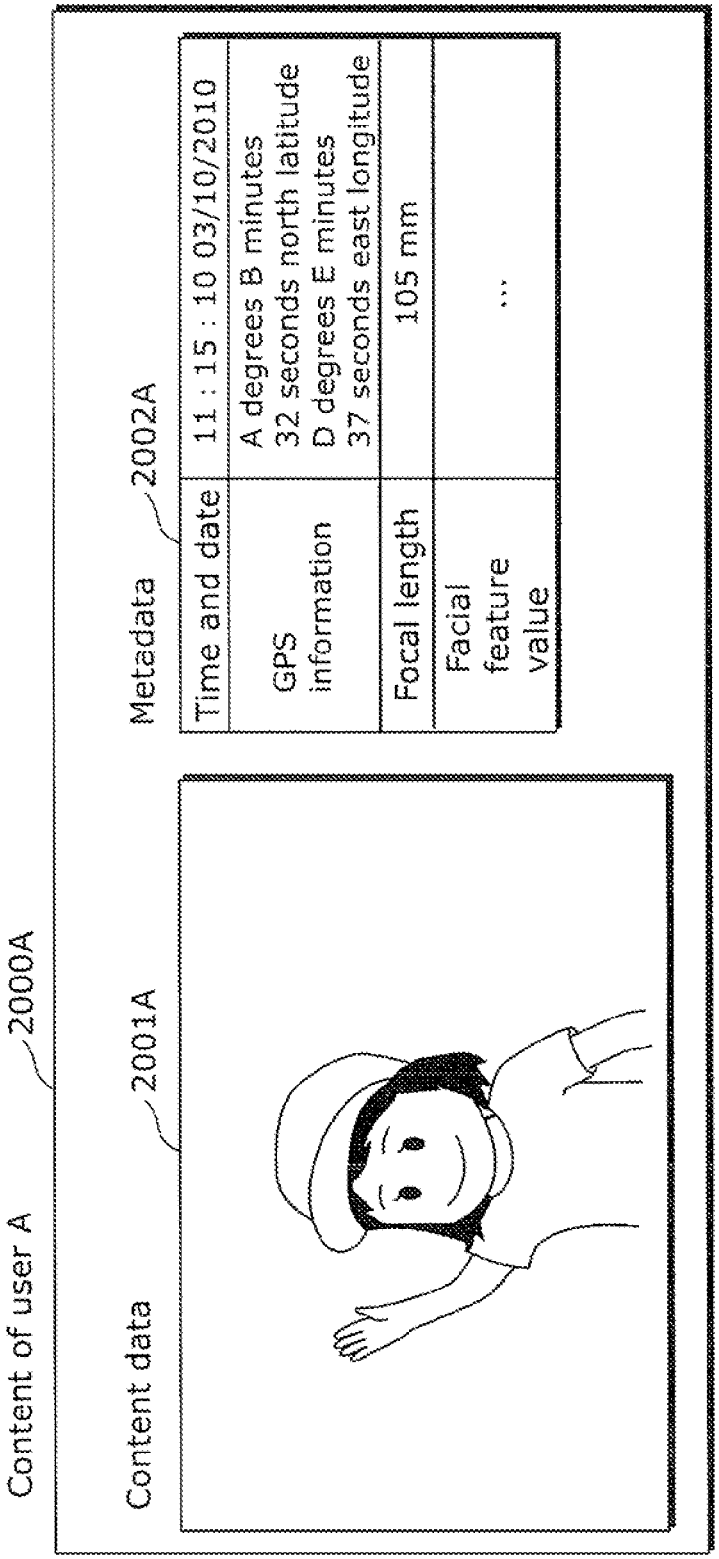
FIG. 23A is a diagram showing a specific example of content.

The above-described operation will be explained using an example below. As shown in FIG. 18, the content management apparatus 130A of the user A and the content management apparatus 1306 of the user B are connected via the communication network. FIG. 23A is a diagram showing an example of content 2000A the user A attempts to register into the content management apparatus 130A. FIG. 23B is a diagram showing an example of content 2000B that is already registered in the content management apparatus 130B. The contents 2000A and 2000B are mostly the same as the contents described as the examples in Embodiment 2 (FIGS. 16A and 16B). However, the present embodiment differs from Embodiment 2 in that a face of the user A's child appears in the contents 2000A and 2000B, and thus a metadata element indicating facial feature value (a same person is photographed from slightly different angles; therefore, the values of the metadata elements indicating facial feature value are presumed to be quite close between the metadata 2002A and the metadata 2002B) is added to the metadata 2002A and metadata 2002B.

When the user A registers the content 2000A into the content management apparatus 130A, the content data 2001A and the metadata 2002A of the content 2000A are registered into the data storage unit 101A, and also, the metadata 2002A is transmitted to the content management apparatus 130B.

Receiving the metadata 2002A, the content management apparatus 130B searches the data storage unit 101B for the metadata 2002B having time and date and GPS information which are close to the time and date and GPS information included in the metadata 2002A, and transmits, as related metadata to the content management apparatus 130A, the metadata elements indicating focal length, name of person, name of event and comment which are the results of excluding the metadata element indicating time and date and GPS information from the metadata 2002B.

Figure 23C:
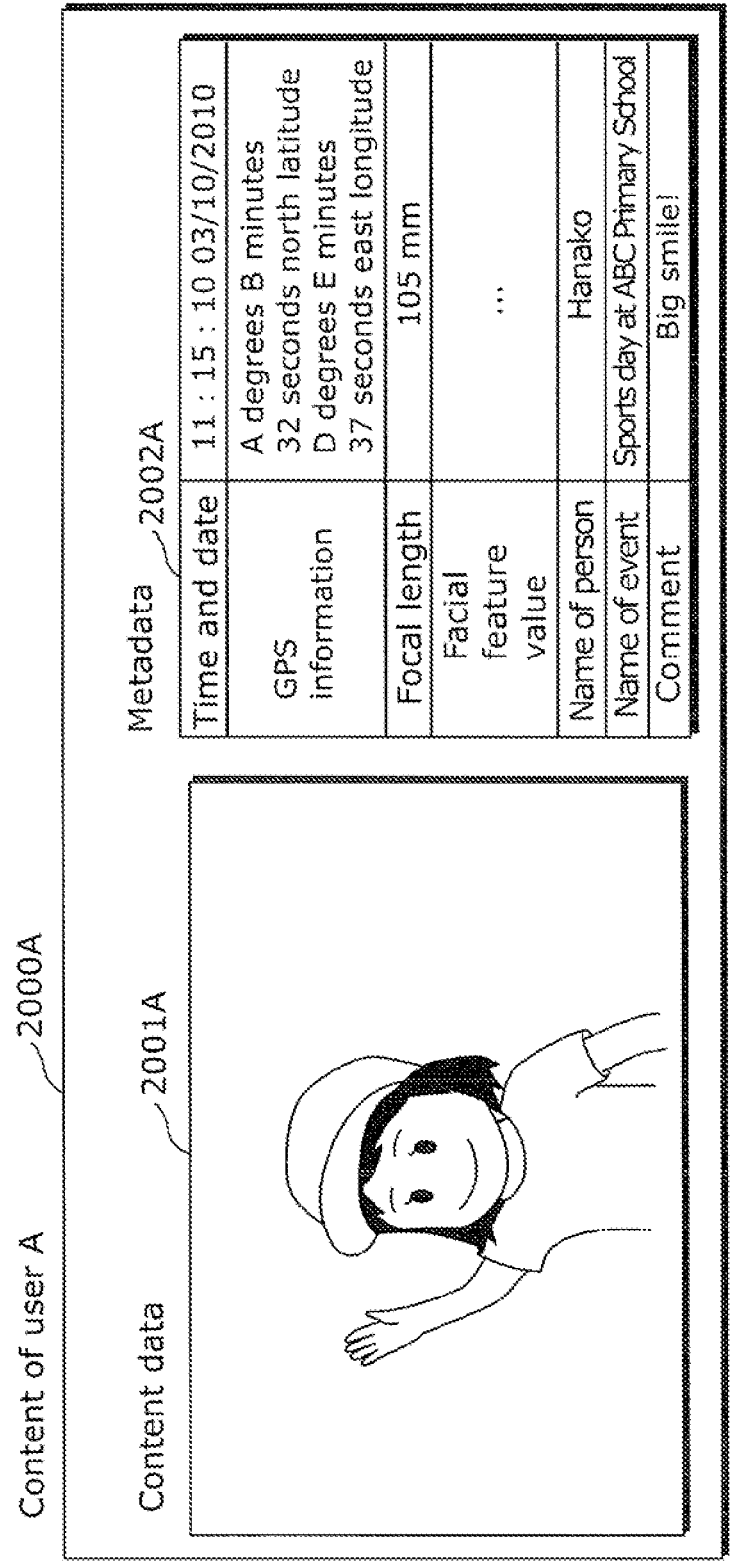
FIG. 23C is a diagram showing another specific example of content.

With the operation performed by the import determination unit 135A, as shown in FIG. 22, the content management apparatus 130A which has received the related metadata determines that the focal length (105 mm) included in the related metadata and the focal length (105 mm) included in the metadata 2002A are set within the telephoto zoom range as they both indicate a value larger than the predetermined value (e.g., 50 mm), and performs distance calculation between a value of the metadata element indicating facial feature value which is included in the related metadata and a value of the metadata element indicating facial feature value which is included in the metadata 2002A. As it is assumed that both of the values are quite close, it is determined as a result of the calculation that a person who appears in the respective contents 2000A and 2000B is the same person. As shown in FIG. 23, the content management apparatus 130A then adds, to the metadata 2002A related to the content data 2001A, the metadata elements which indicate information other than focal length and facial feature value within the related metadata.

Thus, the content management apparatus according to the present embodiment presumes, based on photographic information, a user's intention of photographing and determines, based on the presumption, whether the metadata held by another content management apparatus is importable or not by further comparing the facial feature values. In this way, the content management apparatus achieves an import of useful metadata with accuracy. Thus, it is possible to prevent an import of unnecessary metadata and perform an import of useful metadata.

It should be noted that, in the present embodiment, the data registration unit 102 examines whether or not a person appears in the content data 201, and in the case it does, the data registration unit 102 registers a metadata element indicating facial feature value, as a part of the metadata 202. However, it is a conceivable case that a metadata element indicating facial feature value has already been assigned by a photographing device. In such case, the data registration unit 102 may prioritize the metadata element indicating facial feature value which is assigned by the photographing device, and may not perform the operations of face detection and facial feature value extraction.

The above has described the content management apparatus 130 according to the present invention based on the embodiments, however, the present invention is not limited to these embodiments. All kinds of modifications in the embodiments that the persons skilled in the art could think of, and an embodiment composed by combining the components of different embodiments should be included within the scope of the present invention insofar as they do not depart from the spirit and scope of the present invention.

Figure 24:
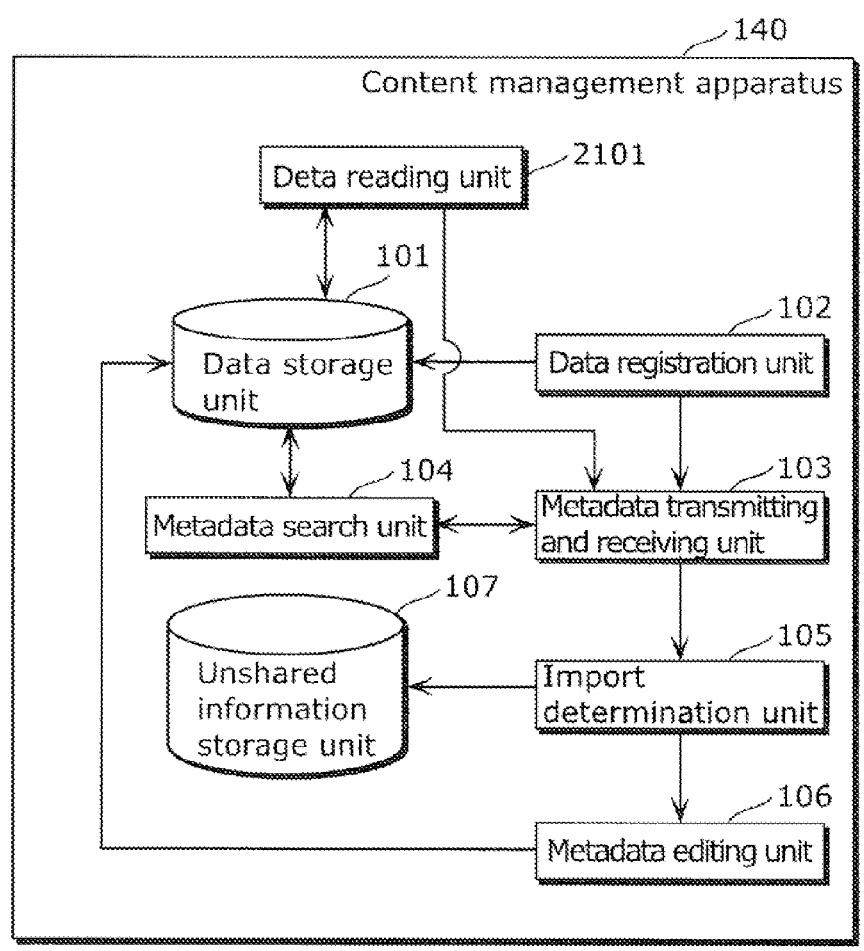
FIG. 24 is a block diagram showing a functional structure of a content management apparatus according to Embodiment 4.

For example, it is described in all of the embodiments that when content is registered, metadata is transmitted to another content management apparatus and determination on whether or not received related metadata is importable is performed. Nevertheless, the operation described above may be performed when the data storage unit 101 is accessed for a replay of contents or for an obtainment of a list of contents. For instance, as shown in FIG. 24, the content management apparatus 140 may include a data reading unit 2101 in addition to the components of the content management apparatus 100 described in Embodiment 1. When reading content data from the data storage unit 101, the data reading unit 2101 reads the metadata related to the content from the data storage unit 101 and outputs the read-out metadata to the metadata transmitting and receiving unit 103. The metadata transmitting and receiving unit 103 transmits the metadata to another content management apparatus and receives related metadata. The import determination unit 105 determines whether the received related metadata is importable or not. Thus, it is possible to increase the amount of metadata by way of data reading as a trigger performed by an instruction to replay content which is given by the user or given in an application, or performed not by a user's instruction but by the content management apparatus 140 with the view to maintain contents or metadata.

Note that the trigger for the determination on whether or not related metadata is importable is not limited to those described above. For example, by way of timer control, the data reading unit 2101 of the content management apparatus 130 may read metadata from the data storage unit 101 and the content management apparatus 130 may start the determination on whether or not related metadata is importable, at a pre-set time.

It is also described in all the embodiments that the content management apparatus automatically assigns, to content, metadata that is shared with another content management apparatus, however, the content management apparatus may actually inquire of the user about whether or not to assign the shared metadata. In such case, a screen inquiring of the user is presented on a display equipped to the apparatus or on a display separately connected to the apparatus, and the shared metadata is assigned to the content through a response from the user requesting for the assignment.

It is explained in all the embodiments that the content 200 is a file consisting of the content data 201 and zero or more than one metadata 202, however, the content data 201 and the metadata 202 may be managed in different databases.

According to all the embodiments, it is described that the metadata other than the metadata, such as time and date, GPS information and photographic information, which are automatically recorded together with content is not assigned beforehand to content to which metadata is to be added, however, the present invention should not be limited to this. For example, metadata assigned by the user himself/herself or metadata that has already been obtained from another content management apparatus may be assigned to content.

Figure 25B:
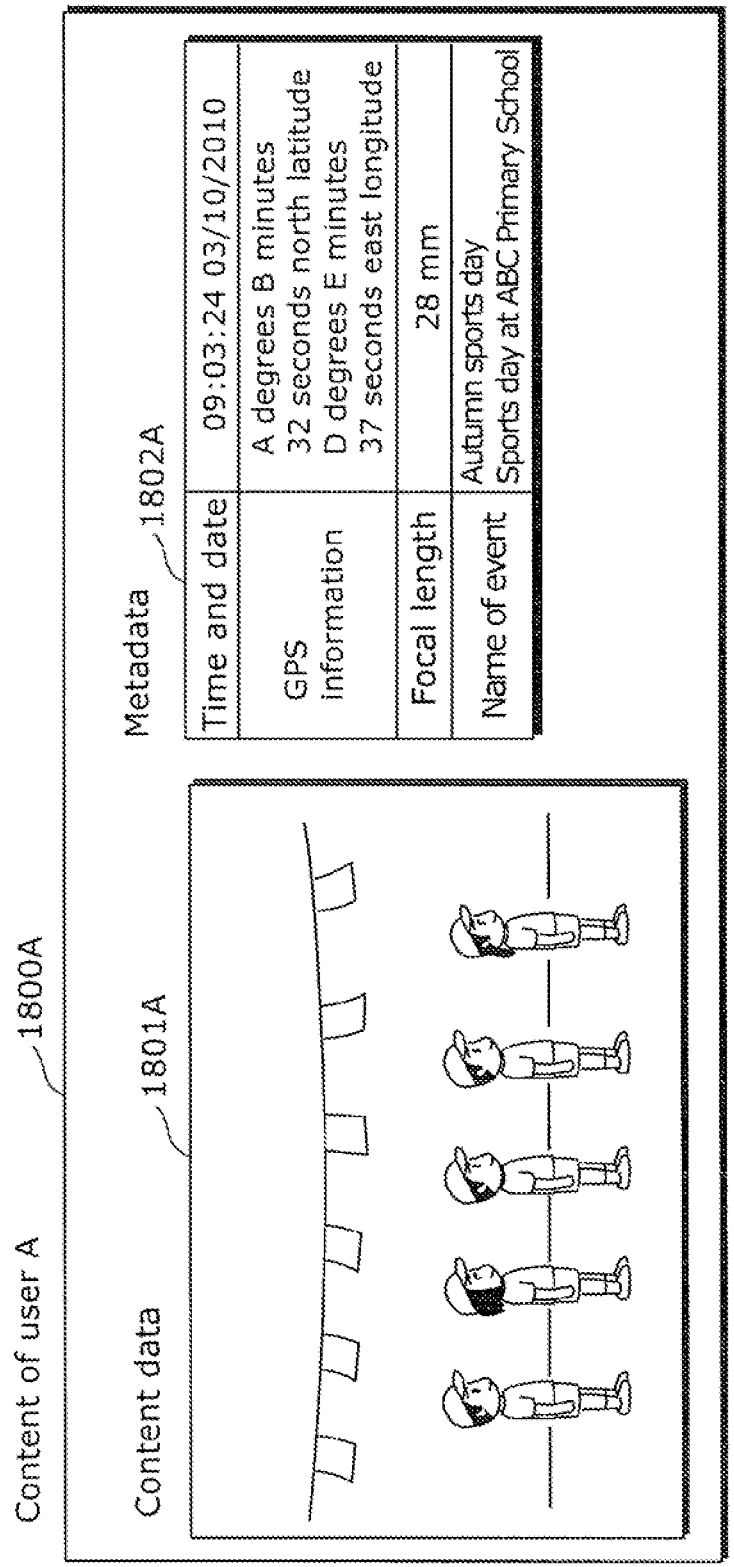
FIG. 25B is a diagram showing another specific example of content.

Taking an example of Embodiment 3, for instance, it is assumed that the content 1800A which includes the metadata 1802A, as shown in FIG. 25A, has previously been registered in the content management apparatus 130A. In the metadata 1802A, a metadata element of which the type is "name of event" and the value indicates "autumn sports day" is previously included. The metadata 1802B of the content 1800B stored in the content management apparatus 130B, as shown in FIG. 21B, may be added to the metadata 1802A. Here, the metadata 1802B includes the metadata element of which the type is "name of event", which is the same as the type of the metadata element included in the metadata 1802A, and the value indicates "sports day at ABC Primary School". In such case, "sports day at ABC Primary School" may be added as a value of the metadata element of which the type is "name of event" in the metadata 1802A, as shown in 25, FIG. 25B.

It is described in all the embodiments that the metadata indicating time and date and GPS information which are close to the time and date and GPS information included in received metadata should be targeted for the import determination. However, the method used for deciding on which metadata should be targeted for import determination is not limited to the above-described method. For example, the metadata of which the time and date excepting year are within a certain period of time and of which the GPS information is the very same may be targeted for the import determination. This achieves, for instance, sharing of the metadata of the photos taken in an event (e.g., sports day or cherry blossom viewing) which annually takes place in the same season.

According to all the embodiments, the cases using image data as content data are described, however, the content data intended for the present invention should not be limited to image data. The content data may be music data, for instance. In such case, metadata of which the metadata elements indicating information such as name of song and name of composer instead of information indicating time and date and GPS information may be received from another content management apparatus and the import determination may be performed for such metadata.

Figure 26:
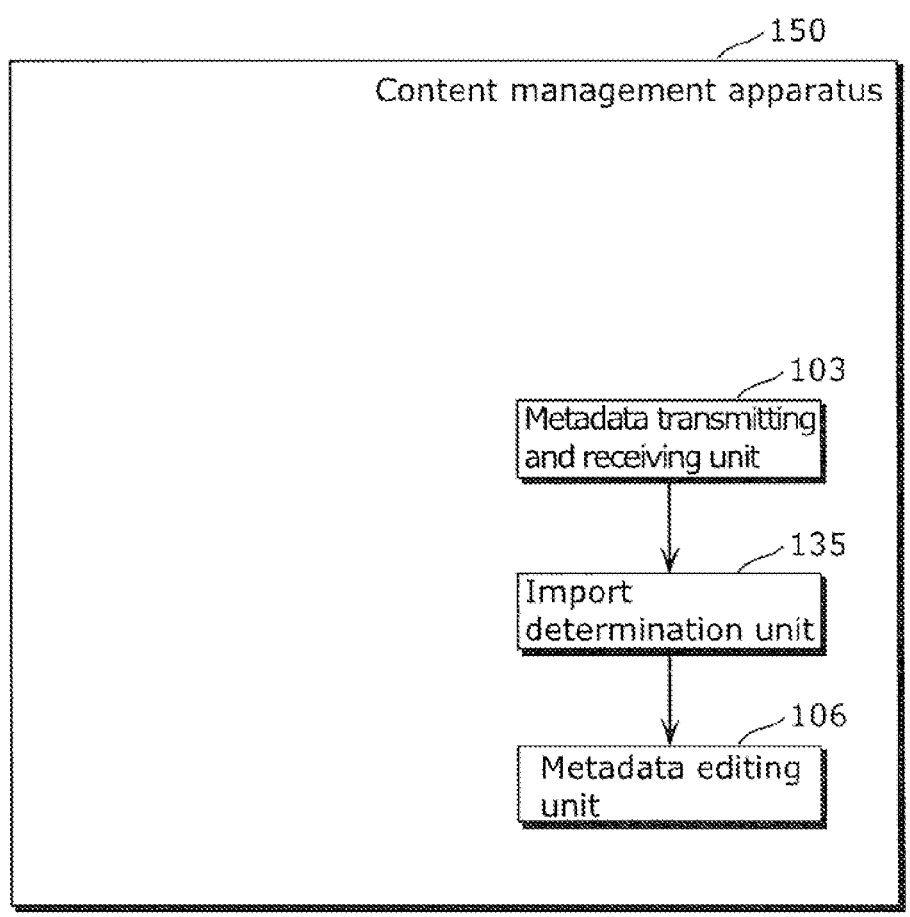
FIG. 26 is a block diagram showing a content management apparatus equipped with the components necessary for the present invention.

FIG. 26 shows a block diagram of the content management apparatus having the components indispensable for the present invention. A content management apparatus 150 includes the metadata transmitting and receiving unit 103, the import determination unit 135 and the metadata editing unit 106. In other words, the data storage unit 101, the data registration unit 102 and the metadata search unit 134 as described above in the embodiments are not necessarily indispensable as the components, and the content management apparatus 150 may not have the functions to search for related metadata which is related to received metadata and to transmit the related metadata.

Each apparatus as described above may be comprised in a computer system consisting of a microprocessor, a ROM, a RAM, a hard disc drive, a display unit, a keyboard, a mouse, etc. A computer program is stored in the RAM or in the hard disc drive. Each apparatus achieves its function through the operations performed by the microprocessor according to the computer program. The computer program is composed of a combination of plural operation codes indicating commands directed to the computer so that predetermined functions are achieved.

Moreover, a part or all of the components composing each apparatus as described above may be comprised in a single system LSI (Large Scale Integration). The system LSI is a super multi-functioned LSI manufactured by accumulating plural components on a chip. More concretely, the system LSI is a computer system consisting of a microprocessor, a ROM, a RAM and others. A computer program is stored in the RAM. The system LSI achieves its function through the operations performed by the microprocessor according to the computer program.

A part or all of the components composing each apparatus as described above may be comprised of an IC card removable from each apparatus or a module. The IC card or the module is a computer system consisting of a microprocessor, a ROM, a RAM, and others. The IC card or the module may include the above-described super multi-functioned LSI. The IC card or the module achieves its function through the operations performed by the microprocessor according to the computer system. The IC card or the module may be of anti-tamper.

Two content management apparatuses may be physically incorporated into one computer. In this case, a program executing the processing units included in two content management apparatuses is operated in a computer, and an internal bus may be used instead of a communication network. Likewise, two content management apparatuses may be physically incorporated into a system LSI, an IC card or a module.

The present invention may be the method as described above or a computer program for achieving the method by a computer or a digital signal composed of the computer program.

According to the present invention, the computer program or the digital signal described above may be recorded into a computer-readable nonvolatile recording medium such as a flexible disc, a hard disc, a CD-ROM, an MO, a DVD, a DVD-ROM, a DVD-RAM, a BD (Blu-Ray Disc (registered trademark)), a semiconductor memory or the like. The present invention may also be the digital signal recorded in such nonvolatile recording medium.

According to the present invention, the computer program or the digital signal may be transferred via an electric communication line, a wireless or wired communication line, a network as represented by the Internet, a data broadcasting, and others.

The present invention may be a computer system comprised of a microprocessor and a memory, in which the memory stores the computer program as described above and the microprocessor is operated according to the computer program.

The present invention may be embodied in another independent computer system by transferring the program or the digital signal recorded in the nonvolatile recording medium, or by transferring the program or the signal via the network.

Each of the above-described embodiments and the variations may be combined. For instance, the import determination unit of the content management apparatus may execute plural import determination processing among all of the processing performed by the import determination as described in Embodiments 1 through 4.

The presently disclosed embodiments should be considered in all respects to be illustrative and not restricted. The scope of the invention is indicated by the appended claims rather than the foregoing description and all changes that come within the scope of the claims as well as within the meaning and range of equivalence are intended to be embraced therein.

INDUSTRIAL APPLICABILITY

The present invention is applicable as a content management apparatus that achieves to import useful metadata without importing unnecessary metadata, when assigning metadata to content through the sharing of metadata held by another content management apparatus.

REFERENCE SIGNS LIST 100, 100A, 1008, 120, 120A, 120B, 130, 130A, 130B, 140, 150 content management apparatus
101, 101A, 101B data storage unit
102, 102A, 102B data registration unit
103, 103A, 103B metadata transmitting and receiving unit
104, 104A, 104B, 134, 134A, 134B metadata search unit
105, 105A, 105B, 115, 115A, 115B, 135, 135A, 135B import determination unit
106, 106A, 106B metadata editing unit
107, 107A, 107B unshared information storage unit
200, 1000A, 1000B, 1400A, 1400B, 1800A, 1800B, 2000A, 2000B content
201, 1001A, 1001B, 1401A, 1401B, 1801A, 1801B, 2001A, 2001B content data
202, 1002A, 1002B, 1402A, 1402B, 1802A, 1802B, 2002A, 2002B metadata
203 metadata element 401 name dictionary
402 sensitivity word dictionary
1101, 1101A, 1101B shared information storage unit
1201 importable-name dictionary
1202 address dictionary
1203 landmark dictionary
1204 event name dictionary
2101 data reading unit

The invention claimed is:

1. A content management apparatus comprising:
a processor;
a metadata transmitting and receiving unit configured to transmit, to another content management apparatus, first metadata which is a type of metadata assigned to content data, and to receive first related metadata which is metadata related to the transmitted first metadata;
an import determination unit configured to determine, using said processor, whether the first related metadata received by said metadata transmitting and receiving unit is importable or not; and
a metadata editing unit configured to update the first metadata by adding, to the first metadata, the first related metadata determined to be importable by said import determination unit,
wherein the content data is image data,
wherein said import determination unit is configured to determine whether the first related metadata is importable or not based on photographic information included in the first metadata and photographic information included in the first related metadata, and
wherein said import determination unit is further configured to determine that the first related metadata is importable in the case where a distance between an image feature included in the first metadata and an image feature included in the first related metadata is equal to or smaller than a predetermined value.

2. The content management apparatus according to claim 1, further comprising
an unshared information storage unit configured to store unshared information indicating information that is not to be imported as metadata,
wherein said import determination unit is configured to determine that the first related metadata is not importable in the case where information included in the first related metadata includes the unshared information stored in said unshared information storage unit.

3. The content management apparatus according to claim 2,
wherein the unshared information includes a word that is at least one of names of persons and sensitivity words.

4. The content management apparatus according to claim 1, further comprising
a shared information storage unit configured to store shared information indicating information that is to be imported as metadata,
wherein said import determination unit is configured to determine that the first related metadata is importable in the case where information included in the first related metadata includes the shared information stored in said shared information storage unit.

5. The content management apparatus according to claim 4,
wherein the shared information includes a word that is at least one of the following: names of persons; addresses; names of landmarks; and names of events.

6. The content management apparatus according to claim 1,
wherein the photographic information includes at least information regarding focal length.

7. The content management apparatus according to claim 1, further comprising:
a data storage unit configured to store content data and metadata that is assigned to the content data; and
a data registration unit configured to register the content data and the metadata into said data storage unit, and to transmit the metadata as the first metadata to the other content management apparatus via said metadata transmitting and receiving unit, the metadata being registered together with the content data.

8. The content management apparatus according to claim 7, further comprising
a data reading unit configured to read the content data and the metadata from said data storage unit, and to transmit the metadata as the first metadata to the other content management apparatus via said metadata transmitting and receiving unit, the metadata being read together with the content data.

9. The content management apparatus according to claim 7, further comprising
a metadata search unit configured (i) to receive second metadata from the other content management apparatus via said metadata transmitting and receiving unit, (ii) to search said data storage unit for second related metadata which is metadata related to the received second metadata, and (iii) and to transmit the searched-out second related metadata to the other content management apparatus via said metadata transmitting and receiving unit.

10. The content management apparatus according to claim 9,
wherein the second related metadata is metadata including at least one of time and date information and location information, which respectively have a value that is within a predetermined range from a reference point that is at least one of values indicated in time and date information and location information which are included in the received second metadata.

11. A content management method comprising:
transmitting, to another content management apparatus, first metadata which is a type of metadata assigned to content data, and receiving first related metadata which is metadata related to the first metadata that was transmitted;
determining whether the first related metadata received in said transmitting and receiving is importable or not; and
updating the first metadata by adding, to the first metadata, the first related metadata determined to be importable in said determining,
wherein the content data is image data,
wherein said determining determines whether the first related metadata is importable or not based on photographic information included in the first metadata and photographic information included in the first related metadata, and
wherein said determining determines that the first related metadata is importable in the case where a distance between an image feature included in the first metadata and an image feature included in the first related metadata is equal to or smaller than a predetermined value.

12. A non-transitory computer-readable recording medium in which a content management program for causing a computer to execute the content management method according to claim 11 is recorded.

13. A content management apparatus comprising:
a processor;

a metadata transmitting and receiving unit configured to transmit, to another content management apparatus, first metadata which is a type of metadata assigned to content data, and to receive first related metadata which is metadata related to the transmitted first metadata;

an import determination unit configured to determine, using said processor, whether the first related metadata received by said metadata transmitting and receiving unit is importable or not;

a metadata editing unit configured to update the first metadata by adding, to the first metadata, the first related metadata determined to be importable by said import determination unit;

a data storage unit configured to store content data and metadata that is assigned to the content data; and a data registration unit configured to register the content data and the metadata into said data storage unit, and to transmit the metadata as the first metadata to the other content management apparatus via said metadata transmitting and receiving unit, the metadata being registered together with the content data; and a metadata search unit configured (i) to receive second metadata from the other content management apparatus via said metadata transmitting and receiving unit, (ii) to search said data storage unit for second related metadata which is metadata related to the received second metadata, and (iii) to transmit the searched-out second related metadata to the other content management apparatus via said metadata transmitting and receiving unit, wherein the second related metadata is metadata including at least one of time and date information and location information, which respectively have a value that is within a predetermined range from a reference point that is at least one of values indicated in time and date information and location information which are included in the received second metadata.

14. A content management method comprising:

transmitting, to another content management apparatus, first metadata which is a type of metadata assigned to content data, and receiving first related metadata which is metadata related to the first metadata that was transmitted;

determining whether the first related metadata received in said transmitting and receiving is importable or not;

updating the first metadata by adding, to the first metadata, the first related metadata determined to be importable in said determining;

storing, in a data storage unit, content data and metadata that is assigned to the content data;

registering the content data and the metadata into the data storage unit, and transmitting the metadata as the first metadata to the other content management apparatus, the metadata being registered together with the content data; and receiving second metadata from the other content management apparatus, searching the data storage unit for second related metadata which is metadata related to the received second metadata, and transmitting the searched-out second related metadata to the other content management apparatus, wherein the second related metadata is metadata including at least one of time and date information and location information, which respectively have a value that is within a predetermined range from a reference point that is at least one of values indicated in time and date information and location information which are included in the received second metadata.

15. A non-transitory computer-readable recording medium in which a content management program for causing a computer to execute the content management method according to claim 14 is recorded.

* * * * *